US010924220B2

(12) United States Patent
You et al.

(10) Patent No.: US 10,924,220 B2
(45) Date of Patent: Feb. 16, 2021

(54) HYBRID AUTOMATIC REPEAT REQUEST METHOD AND TERMINAL DEVICE

(71) Applicant: HUAWEI TECHNOLOGIES CO., LTD., Guangdong (CN)

(72) Inventors: Chunhua You, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/269,283

(22) Filed: Feb. 6, 2019

(65) Prior Publication Data

US 2019/0190661 A1 Jun. 20, 2019

Related U.S. Application Data

(63) Continuation of application No. PCT/CN2016/094338, filed on Aug. 10, 2016.

(51) Int. Cl.
*H04L 1/08* (2006.01)
*H04L 1/18* (2006.01)
(Continued)

(52) U.S. Cl.
CPC ............ *H04L 1/1812* (2013.01); *H04L 1/08* (2013.01); *H04L 1/189* (2013.01); *H04L 1/1883* (2013.01);
(Continued)

(58) Field of Classification Search
CPC ....... H04L 1/1812; H04L 1/1896; H04L 1/08; H04W 74/0833; H04W 72/14; H04W 72/0446; H04W 76/28
See application file for complete search history.

(56) References Cited

U.S. PATENT DOCUMENTS

2009/0180427 A1 7/2009 Kuo
2010/0035581 A1* 2/2010 Park ................. H04W 72/0413
455/412.1
(Continued)

FOREIGN PATENT DOCUMENTS

CA 2879201 A1 4/2014
CN 101483885 A 7/2009
(Continued)

OTHER PUBLICATIONS

3GPP TSG-RAN WG2 #93, Feb. 2016, (MAC impacts of Asynchronous HARQ for BL UEs and UEs in EC, R2-161689).*
(Continued)

*Primary Examiner* — Lakeram Jangbahadur
(74) *Attorney, Agent, or Firm* — Leydig, Voit & Mayer, Ltd.

(57) ABSTRACT

Embodiments of the present invention provide a hybrid automatic repeat request method and a terminal device. The method includes: obtaining a first uplink grant (UL grant) sent by a base station, where the first uplink grant is carried in a media access control MAC message; transmitting uplink data based on the first uplink grant, and starting a first timer; starting a second timer after the first timer expires; and listening to a physical downlink control channel PDCCH based on the second timer. According to the hybrid automatic repeat request method and the terminal device in the embodiments of the present invention, electricity can be saved, and a retransmission delay can be reduced.

13 Claims, 7 Drawing Sheets

(51) Int. Cl.
  *H04W 76/28* (2018.01)
  *H04W 72/04* (2009.01)
  *H04W 72/14* (2009.01)
  *H04W 74/08* (2009.01)

(52) U.S. Cl.
  CPC ....... *H04L 1/1896* (2013.01); *H04W 72/0446* (2013.01); *H04W 72/14* (2013.01); *H04W 74/0833* (2013.01); *H04W 76/28* (2018.02)

(56) References Cited

U.S. PATENT DOCUMENTS

| | | | |
|---|---|---|---|
| 2015/0282125 A1 | 10/2015 | Lee et al. | |
| 2015/0319800 A1* | 11/2015 | Park | H04L 1/1812 370/329 |
| 2016/0044641 A1 | 2/2016 | Bai et al. | |

FOREIGN PATENT DOCUMENTS

| | | | | |
|---|---|---|---|---|
| CN | 101777972 A | 7/2010 | | |
| CN | 101827425 A | 9/2010 | | |
| CN | 101841823 A | 9/2010 | | |
| CN | 102215551 A | 10/2011 | | |
| CN | 102595606 A | 7/2012 | | |
| CN | 105103590 A | 11/2015 | | |
| CN | 105122858 A | 12/2015 | | |
| CN | 105409317 A | 3/2016 | | |
| CN | 105722195 A | 6/2016 | | |
| WO | 2010048998 A1 | 5/2010 | | |
| WO | WO-2010048998 A1 * | 5/2010 | ........... | H04L 1/1883 |
| WO | 2014069826 A1 | 5/2014 | | |

OTHER PUBLICATIONS

International Search Report dated May 2, 2017 in corresponding International Application No. PCT/CN2016/094338.

"MAC impacts of asynchronous HARQ for BL UEs and UEs in EC," 3GPP TSG-RAN WG2 #93, St. Julian's, Malta, XP051055503, R2-161689, pp. 1-10, 3rd Generation Partnership Project—Valbonne, France (Feb. 15-19, 2016).

"Reconsideration on drx-InactivityTimer for NB-IoT," 3GPP TSG-RAN WG2 Meeting #94, Nanjing, China, XP051105485, R2-164202, pp. 1-6, 3rd Generation Partnership Project—Valbonne, France (May 23-27, 2016).

International Search Report dated May 2, 2017 in corresponding International Patent Application No. PCT/CN2016/094338 (7 pages).

Written Opinion of the International Searching Authority dated May 2, 2017 in corresponding International Patent Application No. PCT/CN2016/094338 (5 pages).

EP/16912111.8-1205, Office Action, dated Jun. 2, 2020.

* cited by examiner

HYBRID AUTOMATIC REPEAT REQUEST METHOD AND TERMINAL DEVICE

CROSS-REFERENCE TO RELATED APPLICATIONS

This application is a continuation of International Application No. PCT/CN2016/094338, filed on Aug. 10, 2016, the disclosure of which is hereby incorporated by reference in its entirety.

TECHNICAL FIELD

The present invention relates to the field of communications technologies, and more specifically, to a hybrid automatic repeat request (Hybrid automatic repeat request, HARQ) method and a terminal device.

BACKGROUND

In a Long Term Evolution (Long Term Evolution, LTE) system, a hybrid automatic repeat request (Hybrid automatic repeat request, HARQ) is introduced, to improve data transmission reliability. Before data is transmitted, a terminal device needs to access a network. (To be specific, the terminal device enters a connected mode from an idle mode.) In LTE, a random access process is introduced. There are two types of random access: contention-based random access and non-contention-based random access. In a random access process, the terminal device needs to listen to a physical downlink control channel (Physical Downlink Control Channel, PDCCH) to perform HARQ transmission of the data. In this process, if the terminal device continuously listens to the PDCCH, power consumption is very high. If the terminal device does not listen to the PDCCH in time, the terminal device needs to wait for retransmission of a next period, and consequently, a retransmission delay is increased. Based on this, a method is urgently required to resolve the problem.

SUMMARY

Embodiments of the present invention provide a hybrid automatic repeat request method and a terminal device, to save electricity and reduce a retransmission delay.

According to a first aspect, a hybrid automatic repeat request method is provided, including:

obtaining a first uplink grant (UL grant) sent by a base station, where the first uplink grant is carried in a media access control MAC message;

transmitting uplink data based on the first uplink grant, and starting a first timer;

starting a second timer after the first timer expires; and listening to a physical downlink control channel PDCCH based on the second timer.

Optionally, in some possible implementations, the terminal device does not listen to the PDCCH before the first timer expires or is stopped.

For example, before a HARQ RTT Timer expires or is stopped, the terminal device may choose not to listen to a PDCCH of a cell, so that a quantity of electricity of the terminal device can be saved.

In this embodiment of the present invention, the terminal device transmits the uplink data based on the first uplink grant, and starts the first timer. After the first timer expires, the terminal device starts the second timer. Finally, the terminal device listens to the PDCCH based on the second timer. In this way, electricity can be saved, and a retransmission delay can be reduced.

In this embodiment of the present invention, the first timer is an uplink hybrid automatic repeat request HARQ round-trip (Round Trip Time, RTT) timer (Timer), and the second timer is a discontinuous reception uplink retransmission timer DRX-UL retransmission timer.

Optionally, a time length of the first timer (HARQ RTT Timer) may be specified in a protocol, and a time length of the second timer (DRX-UL Retransmission Timer) may be indicated by the base station.

Optionally, before the first timer expires or is stopped, the terminal device may choose to listen to the PDCCH if necessary.

Optionally, in some possible implementations, the terminal device may access a network in a contention random access manner or a contention-free random access manner.

Optionally, in some possible implementations, the method further includes:

before the second timer expires and/or is stopped, if a second uplink grant sent by the base station through the PDCCH is detected through listening, performing hybrid automatic repeat request HARQ retransmission or initial transmission of the uplink data based on an indication of the second uplink grant.

For example, before the DRX-UL retransmission timer expires and/or is stopped, if the terminal device detects, through listening, the second uplink grant sent by the base station through the PDCCH, the terminal device may perform HARQ retransmission or initial transmission of the uplink data based on the second uplink grant. The second uplink grant is sent by using the PDCCH, and the second uplink grant is used to indicate retransmission or initial transmission.

Therefore, the terminal device transmits the uplink data based on the first uplink grant, and starts the first timer. After the first timer expires, the terminal device starts the second timer. Before the second timer expires and/or is stopped, the terminal device detects, through listening, the second uplink grant sent by the base station through the PDCCH. In this way, electricity can be saved, and the retransmission delay can be reduced. Further, the terminal device can perform HARQ retransmission of the uplink data based on the second uplink grant detected through listening.

Optionally, in some possible implementations, the listening to a physical downlink control channel PDCCH based on the second timer includes:

before the second timer expires and/or is stopped, controlling, by a MAC layer of the terminal device, a physical layer of the terminal device to listen to the PDCCH.

In other words, the MAC layer of the terminal device may control the physical (PHY) layer of the terminal device to listen to the PDCCH.

Optionally, in some possible implementations, the method further includes:

after the second timer expires and/or is stopped, determining, based on current discontinuous reception DRX status information of the terminal device, whether to continue to listen to the PDCCH.

For example, after the DRX-UL retransmission timer expires and/or is stopped, the terminal device may select, based on the current discontinuous reception DRX status information, whether to enter a DRX dormant period. If all conditions of the DRX status information required for listening to the PDCCH are met, the terminal device may continue to listen to the PDCCH. If any condition of the DRX status information required for listening to the PDCCH is not met, the terminal device may choose to enter the DRX dormant period and do not listen to the PDCCH.

Optionally, in some possible implementations, the transmitting uplink data based on the first uplink grant and starting a first timer includes:

transmitting the uplink data for a plurality of times based on the first uplink grant; and starting the first timer and/or a third timer in a subframe of last transmission in the plurality of times of transmission of the uplink data, where the third timer is configured to wait for the base station to send a contention resolution message.

The terminal device may transmit the uplink data for a plurality of times based on the first uplink grant (to be specific, repetition is introduced and sending is repeatedly performed). In other words, a bundle (bundle) of uplink data is transmitted. Then, the terminal device may start the first timer and/or the third timer in the subframe of last transmission in the plurality of times of transmission. The third timer is configured to wait for the base station to send the contention resolution message.

The third timer herein is a MAC-contention resolution timer (MAC-Contention resolution Timer), and the third timer is introduced for a contention random access scenario, and is mainly configured to indicate a time period of waiting for the base station to send the contention resolution message.

Optionally, a quantity of times the uplink data is transmitted may be indicated by using the first uplink grant.

Therefore, the terminal device transmits the uplink data-transmits the uplink data for a plurality of times based on the first uplink grant, and starts the first timer and/or the third timer in the subframe of last transmission in the plurality of times of transmission of the uplink data. After the first timer expires, the terminal device starts the second timer, and listens to the PDCCH based on the second timer. In this way, electricity can be saved, and the retransmission delay can be reduced. Further, transmission is performed a plurality of times, so that a success rate of data transmission can be improved, and a coverage range can be increased.

Optionally, for HARQ retransmission of the uplink data, repetition may also be introduced for performing transmission a plurality of times. For brevity, details are not described herein.

Optionally, in some possible implementations, the method further includes:

before the third timer expires and/or is stopped, receiving the contention resolution message sent by the base station, where the contention resolution message indicates that random access contention of the terminal device succeeds; and stopping the second timer based on the contention resolution message.

For a contention random access scenario, before the third timer expires and/or is stopped, the terminal device may receive the contention resolution message sent by the base station. After receiving the contention resolution message, the terminal device may consider that random access succeeds, so as to stop the second timer that is configured to listen to retransmission.

Optionally, the contention resolution message may be scrambled by using a unique cell identifier C-RNTI of the terminal device, or may be scrambled by using a temporary cell identifier TC-RNTI of the terminal device. Specifically, which information is used for scrambling depends on whether the terminal device currently has the C-RNTI.

Optionally, in some possible implementations, the transmitting uplink data based on the first uplink grant and starting a first timer includes:

when the first timer is started, if the second timer does not expire and/or is not stopped, stopping the second timer.

When the terminal device starts the first timer, if the terminal device finds that the second timer does not expire and/or is not stopped, the terminal device stops the second timer, so as to start the second timer after the first timer expires.

Optionally, in some possible implementations, before the receiving a first uplink grant sent by a base station, the method further includes:

selecting, by the MAC layer of the terminal device, a plurality of random access resources and a plurality of random access radio network temporary identifiers RA-RNTIs, and submitting the plurality of random access resources and the plurality of RA-RNTIs to the physical layer of the terminal device;

performing, by the physical layer of the terminal device, clear channel assessment on at least one channel, to determine a first channel, where the first channel is in an idle mode, the plurality of random access resources include a random access resource corresponding to the first channel, and the plurality of RA-RNTIs include an RA-RNTI corresponding to the first channel; and optionally, generating, by the physical layer of the terminal device, a random access preamble sequence based on a preamble index number of the terminal device; and sending, by the physical layer of the terminal device, the random access preamble sequence to the base station by using the random access resource corresponding to the first channel, and optionally, the random access preamble sequence is used by the terminal device to send a service request to the base station; and the obtaining a first uplink grant sent by a base station includes:

receiving, by the physical layer of the terminal device by using the RA-RNTI corresponding to the first channel, the MAC message sent by the base station. Optionally, any preamble index field in the MAC message matches the preamble index number of the terminal device.

In specific implementation, the MAC layer of the terminal device notifies the PHY layer of the terminal device of the preamble index number, at least one selected random access resource, and a random access radio network temporary identifier (RA-RNTI) corresponding to each random access resource. In contention-based random access, the preamble index number is allocated by the base station to the terminal device. Each random access resource may be corresponding to one channel (channel), to be specific, a frequency resource of specific bandwidth. Then, the PHY layer of the terminal device generates the random access preamble sequence based on the preamble index number; determines the first channel (a channel in an idle mode) based on a result of clear channel assessment (Clear Channel Assessment, CCA) or listen before talk (Listen Before Talk, LBT) performed on each channel; and sends the random access preamble sequence to the base station by using the random access resource corresponding to the first channel.

For example, if signal energy received on a channel is less than or equal to a specific threshold, the PHY layer of the terminal device selects one idle channel (the first channel), and sends the random access preamble sequence to the base station on the idle channel by using the random access resource corresponding to the first channel. The PHY layer of the terminal device receives a random access response message based on an RA-RNTI corresponding to the random access resource.

For another example, if all channels are not in an idle mode, the terminal device does not send the preamble sequence.

In this way, the base station may deliver the corresponding random access response message (the MAC message) based on the successfully received random access preamble sequence sent by the terminal device. For example, in non-contention-based random access, the base station may find the corresponding terminal device based on the preamble index number, and then deliver the MAC message including the first uplink grant to the terminal device.

Optionally, when calculating an RA-RNTI, the MAC layer of the terminal device needs to consider a channel index corresponding to a random access resource, a time domain location and a frequency domain location in a corresponding channel, and the like.

Optionally, in specific implementation, the MAC layer of the terminal device notifies the physical layer of the terminal device of a selected random access resource, the preamble index number, and a random access radio network temporary identifier (RA-RNTI). Then, the physical layer of the terminal device generates the random access preamble sequence based on the preamble index number, and sends the random access preamble sequence to the base station that uses the random access resource. Finally, the physical layer of the terminal device receives the random access response message based on the RA-RNTI. The random access response message is the MAC message, and any preamble index field in the MAC message matches the preamble index number of the terminal device.

In contention-based random access, the preamble index number of the terminal device is allocated by the base station to the terminal device. The base station delivers the corresponding random access response message (the MAC message) based on the successfully received random access preamble sequence sent by the terminal device. Any preamble index field in the MAC message matches the preamble index number corresponding to the preamble sequence sent by the terminal device. In other words, a preamble index field included in the MAC message corresponding to the first uplink grant matches the preamble index number of the preamble sequence sent by the terminal device.

In non-contention-based random access, the base station may find the corresponding terminal device based on the preamble index number, and then deliver the MAC message including the first uplink grant to the terminal device.

Optionally, in some possible implementations, a subframe in which the first timer expires or is stopped is the same as or different from a subframe in which the second timer is started.

The subframe in which the terminal device stops the first timer and the subframe in which the terminal device starts the second timer may be a same subframe or may be different subframes.

According to a second aspect, a hybrid automatic repeat request method is provided, including:
determining a hybrid automatic repeat request HARQ process controller;
generating, based on the HARQ process controller, feedback information corresponding to a plurality of HARQ processes; and
sending the feedback information to a base station, where the feedback information is transmitted by using a media access control MAC message.

In this embodiment of the present invention, the terminal device determines the HARQ process controller, and feeds back, in a same subframe, the feedback information of the plurality of HARQ processes, to better adapt uplink and downlink traffic.

Optionally, in some possible implementations, to trigger a feedback status in time, the terminal device may introduce a periodic timer. The terminal device triggers a terminal device to feed back a feedback status of a HARQ process once the periodic timer expires.

Optionally, in some possible implementations, the base station may also trigger, by using an uplink grant, a terminal device to feed back a feedback status of a HARQ process. Optionally, to avoid repeatedly triggering a feedback status, the terminal device may also introduce a prohibit timer. After the prohibit timer expires, the terminal device can trigger the feedback status again.

Therefore, in this embodiment of the present invention, the terminal device determines the HARQ process controller, and feeds back, in one subframe, the feedback information of the plurality of HARQ processes, to better adapt uplink and downlink traffic.

According to a third aspect, a hybrid automatic repeat request method is provided, including:
receiving configuration information sent by a base station, where the configuration information is used to configure an unlicensed (unlicensed) spectrum secondary serving cell;
triggering, by a MAC layer of a terminal device, power headroom report PHR;
determining, by a PHY layer of the terminal device, type2 power headroom of a licensed (licensed) primary serving cell based on a received uplink grant delivered by the base station, where the type2 power headroom represents power headroom existing when a physical uplink control channel PUCCH and a physical uplink shared channel PUSCH are simultaneously transmitted;
notifying, by the PHY layer of the terminal device, the MAC layer of the terminal device of the type2 power headroom of the licensed (licensed) primary serving cell; and
generating, by the MAC layer of the terminal device, a MAC control element of the PHR based on the type2 power headroom of the licensed primary serving cell.

In this embodiment of the present invention, the terminal device needs to support simultaneous transmission of a PUCCH of the licensed primary serving cell and a PUSCH of an unlicensed cell. In addition, configuration of the simultaneous transmission does not depend on configuration of simultaneous transmission of a PUCCH and a PUSCH of a licensed cell.

Optionally, in some possible implementations, a condition of triggering the PHR by the MAC layer of the terminal device includes that a periodic timer is triggered, a path loss variation exceeds a specific threshold, and the like.

Optionally, in this embodiment of the present invention, the type2 power headroom may be specifically represented by using the following formula:

$$PH_{type2}(i) = P_{CMAX,c}(i) - 10\log_{10}$$

$$\left( 10^{(10\log_{10}(M_{PUSCH,c}(i)) + P_{O\_PUSCH,c}(i) + \alpha_c(j)PL_c + \Delta_{TF,c}(i) + f_c(i))/10} + 10^{(P_{O\_PUCCH} + PL_c + h(n_{CQI}, n_{HARQ}, n_{SR}) + \Delta_{F\_PUCCH}(F) + \Delta_{TxD}(F') + g(i))/10} \right),$$

where
$P_{CMAX,c}(i)$ is maximum transmit power of the terminal in a subframe i in a current serving cell c. $M_{PUSCH,c}(i)$ is bandwidth of a PUSCH and is in a unit of RB. $P_{O\_PUSCH,c}(j)$ is expected power when a single RB is received, and a value of $P_{O\_PUSCH,c}(j)$ is controlled by an upper-layer parameter based on different values of ($j \in \{0, 1, 2\}$); $\alpha_c(j)$ is a path loss compensation factor; $PL_c$ is downlink path loss estimation and is in a unit of dB; $\Delta_{TF,c}(i)$ is transmit power offset, and reflects that different modulation formats require different signal to interference plus noise ratios (Signal to Interference plus Noise ratio, "SINK" for short) in PUSCH transmission; and $f_c(i)$ is a current PUSCH power control adjustment status. The parameter $\Delta_{TF,c}(i)$ is defined in a standard:

$$\Delta_{TF,c}(i)=10 \log_{10}(2^{1.25 \cdot BPRE(i)}-1), \text{where}$$

$$BPRE(i)=O_{UCI}(i)/N_{RE}(i), \text{where}$$

$O_{UCI}(i)$ is a quantity of bits for transmitting hybrid automatic repeat request feedback (Hybrid automatic repeat request-Acknowledgment, "HARQ-ACK" for short)/scheduling request (Scheduling Request, "SR" for short)/rank indicator (Rank Indicator, "RI" for short)/channel quality indicator (Channel Quality Indicator, "CQI" for short)/precoding matrix indicator (Precoding Matrix Indicator, "PMI" for short) information in a PUCCH format 4/5. $N_{RE}(i)$ is a quantity of resource elements (Resource element, "RE" for short) in a subframe i. When a PUCCH uses the format 4, $N_{RE}(i)=M_{PUCCH,c}(i) \cdot N_{sc}^{RB} \cdot N_{symb}^{PUCCH}$. When a PUCCH uses the format 5, $N_{RE}(i)=N_{sc}^{RB} \cdot N_{symb}^{PUCCH}/2$. $N_{sc}^{RB}$ is a quantity of subcarriers included in one RB, and $N_{symb}^{PUCCH}$ is a quantity of symbols included in a PUCCH. $P_{O\_PUCCH}$ may be considered as power expected by the base station when a single resource block (Resource Block, "RB" for short) is received, and $P_{O\_PUCCH}$ is related to intensity of noise and interference of an uplink. $h(n_{CQI}, n_{HARQ}, n_{SR})$ is related to a PUCCH format, and different PUCCH formats are corresponding to different values. A value of $\Delta_{F\_PUCCH}$ (F) is controlled by an upper layer, and the value of $\Delta_{F\_PUCCH}$(F) is related to a format used by a PUCCH. A PUCCH format 1a is usually used as a reference. A parameter $\Delta_{TxD}(F')$ is related to transmit diversity, and is valid only when a PUCCH is sent on two antenna ports. Otherwise, a value of the parameter is 0. $g(i)$ is a current PUCCH power control adjustment status.

In this embodiment of the present invention, the type2 power headroom formula is introduced, so that transmit power headroom existing when the PUCCH and the PUSCH are simultaneously transmitted can be determined by using the type2 power headroom formula.

According to a fourth aspect, a hybrid automatic repeat request method is provided, including:

receiving, by a PHY layer of a terminal device, one uplink grant sent by a base station, where the uplink grant is used to schedule transmission of uplink data in a plurality of subframes;

generating, by the PHY layer of the terminal device, a plurality of uplink grants based on the uplink grant, and sends the plurality of uplink grants to a MAC layer of the terminal device by using at least one subframe; and transmitting, by the PHY layer of the terminal device, the uplink data for a plurality of times in the plurality of subframes based on the plurality of uplink grants.

Therefore, the PHY layer of the terminal device may generate a plurality of uplink grants based on one received uplink grant, and submit the plurality of uplink grants to the MAC layer of the terminal device in a plurality of subframes or in a same subframe.

Optionally, in some possible implementations, the PHY layer of the terminal device receives one uplink grant sent by the base station. The uplink grant is used to schedule uplink transmission in a plurality of subframes. The uplink grant includes uplink transmission resources that are of the plurality of uplink subframes and that are allocated by the base station to the terminal device, and the uplink transmission resources may be specifically information such as time-frequency resource information, modulation and coding scheme (Modulation and Coding Scheme, MCS) information, and a HARQ process identifier (ID). Optionally, the plurality of uplink subframes may be continuous, or may be discontinuous.

Optionally, in some possible implementations, the PHY layer of the terminal device may submit the plurality of uplink grants to the MAC layer of the terminal device in a plurality of subframes or in a same subframe. The PHY layer of the terminal device may indicate HARQ information of each uplink subframe. For example, the HARQ information includes at least one of HARQ process ID information, MCS information, transport block size (transport block size, TBS) information, and new data indicator (New Data Indicator, NDI) information that are used. One HARQ process is corresponding to one TTI. In addition, the PHY layer of the terminal further needs to indicate a transmission time interval (Transmission Time Interval, TTI) or a subframe in which uplink transmission of an uplink grant of the MAC layer is performed.

Optionally, in some possible implementations, the PHY layer of the terminal may submit one received uplink grant to the MAC layer of the terminal device, and indicate a specific subframe or TTI in which the uplink grant is used for uplink transmission and a HARQ process used for the uplink transmission. The MAC layer of the terminal generates a plurality of uplink grants based on an indication of the PHY layer of the terminal, and submits each uplink grant to a corresponding HARQ process, to instruct the PHY layer to perform uplink transmission in one subframe or TTI.

Therefore, the MAC layer of the terminal device may generate a plurality of uplink grants based on one received uplink grant, and submit each uplink grant to a corresponding HARQ process, to instruct the PHY layer of the terminal device to perform uplink transmission in one subframe or TTI.

According to a fifth aspect, a terminal device is provided, and is configured to perform the method in any one of the first aspect or the possible implementations of the first aspect. Specifically, the apparatus includes units configured to perform the method in any one of the first aspect or the possible implementations of the first aspect.

According to a sixth aspect, a terminal device is provided, and is configured to perform the method in any one of the second aspect or the possible implementations of the second aspect. Specifically, the apparatus includes units configured to perform the method in any one of the second aspect or the possible implementations of the second aspect.

According to a seventh aspect, a terminal device is provided, and is configured to perform the method in any one of the third aspect or the possible implementations of the third aspect. Specifically, the apparatus includes units configured to perform the method in any one of the third aspect or the possible implementations of the third aspect.

According to an eighth aspect, a terminal device is provided, and is configured to perform the method in any one of the fourth aspect or the possible implementations of the fourth aspect. Specifically, the apparatus includes units configured to perform the method in any one of the fourth aspect or the possible implementations of the fourth aspect.

According to a ninth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor can perform the method in any one of the first aspect or the possible implementations of the first aspect, or the processor can perform the method in any one of the second aspect or the possible implementations of the second aspect, or the processor can perform the method in any one of the third aspect or the possible implementations of the third aspect, or the processor can perform the method in any one of the fourth aspect or the possible implementations of the fourth aspect.

According to a tenth aspect, a computer readable storage medium is provided, the computer readable storage medium stores a program, and the program enables a terminal device to perform the hybrid automatic repeat request method in any one of the first aspect or the possible implementations of the first aspect, or the program enables a terminal device to perform the hybrid automatic repeat request method in any one of the second aspect or the possible implementations of the second aspect, or the program enables a terminal device to perform the hybrid automatic repeat request method in any one of the third aspect or the possible implementations of the third aspect, or the program enables a terminal device to perform the hybrid automatic repeat request method in any one of the fourth aspect or the possible implementations of the fourth aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems such as an existing communications system such as a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, LTE time division duplex (Time Division Duplex, TDD) system, and a Universal Mobile Telecommunications System (Universal Mobile Telecommunications System, UMTS), and in particular, to a future 5G system.

It should be further understood that in the embodiments of the present invention, a network side device may also be referred to as a network device, a base station, or the like, and the base station may be a base transceiver station (Base Transceiver Station, BTS) in GSM or CDMA, or may be a NodeB (NodeB) in WCDMA, or may be an evolved NodeB (Evolved NodeB, eNB or eNodeB) in LTE, or may be a base station device in a future 5G network, or the like. This is not limited in the present invention.

It should be further understood that in the embodiments of the present invention, a terminal device may communicate with one or more core networks (Core Network) through a radio access network (Radio Access Network, RAN). The terminal device may be referred to as an access terminal, user equipment (User Equipment, UE), a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, or the like.

Figure 1:
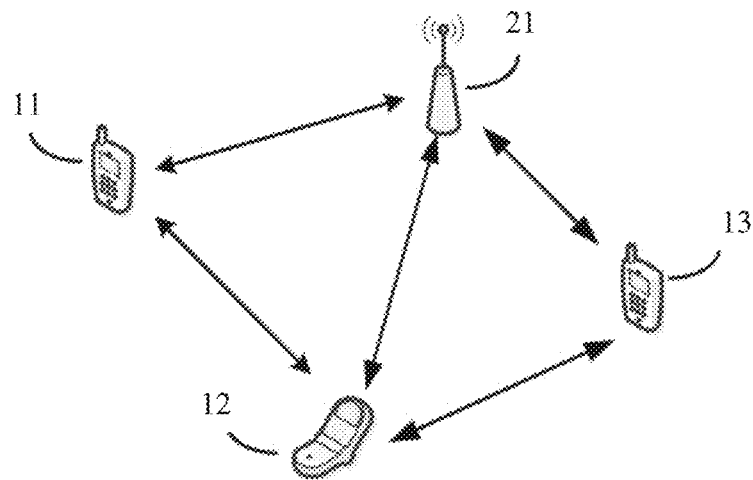
FIG. 1 is a schematic diagram of an application scenario.

FIG. 1 is a schematic diagram of a scenario. It should be understood that, for ease of understanding, the scenario in FIG. 1 is introduced herein as an example for description, but does not constitute a limitation on the present invention. FIG. 1 shows a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 communicates with the base station 21. Alternatively, the terminal device 12 may communicate with the terminal device 11. Alternatively, in another case, the terminal device 13 communicates with the terminal device 12. Random access of the terminal device herein may be contention-based random access or non-contention-based random access.

In an existing hybrid automatic repeat request, a terminal device cannot know when a PDCCH may not need to be listened to, and consequently, electricity is wasted. In addition, if the terminal device misses an opportunity to listen to an uplink grant for retransmission, the terminal device needs to wait for a next period, and consequently, a retransmission delay increases. Based on these problems, a terminal device in this patent tries to enable an uplink hybrid automatic repeat request round-trip latency timer (Uplink Hybrid automatic repeat request Round Trip Time Timer, UL HARQ RTT Timer) in transmission of uplink data, and listen to a PDCCH with reference to a discontinuous reception uplink retransmission timer (Discontinuous Reception Uplink Retransmission Timer, DRX-UL Retransmission Timer), so that electricity can be saved, and a retransmission delay can be reduced.

Figure 2:
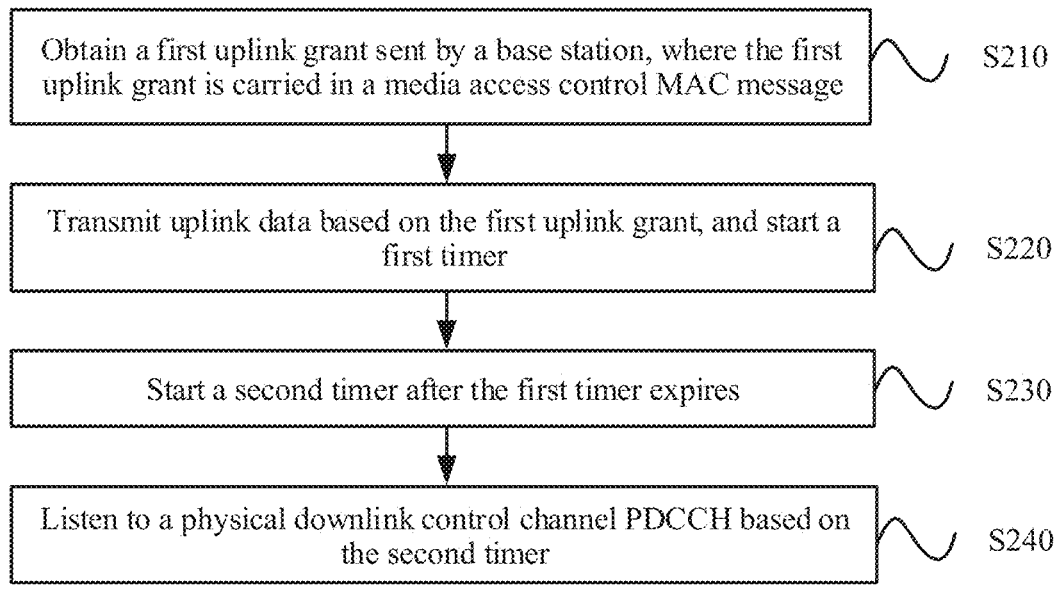
FIG. 2 is a schematic flowchart of a hybrid automatic repeat request method according to an embodiment of the present invention.

FIG. 2 is a schematic flowchart of a hybrid automatic repeat request method 200 according to an embodiment of the present invention. The method 200 may be performed by a terminal device. For example, the terminal device may be the terminal device 11, the terminal device 12, or the terminal device 13 in FIG. 1. As shown in FIG. 2, the method 200 includes the following steps.

S210. Obtain a first uplink grant sent by a base station, where the first uplink grant is carried in a media access control MAC message.

For example, the terminal device may receive a random access response message (Random Access Response, RAR) sent by the base station. The random access response message is a MAC message, and the random access response message includes the first uplink grant (UL grant). The first uplink grant indicates an uplink transmission resource that is used by the terminal device to send uplink data. Optionally, the random access response message may further include: timing advance command (Timing advance command) information, where the timing advance command information is used for uplink synchronization with the terminal device, to facilitate subsequent transmission of uplink data; and temporary cell identifier (Temporary C-RNTI, TC-RNTI) information, where the temporary cell identifier information is used to identify a terminal device in a cell, and the TC-RNTI is invalid in non-contention-based random access and may be ignored.

It should be understood that "first" introduced to the "first uplink grant" is merely for ease of description, and does not constitute a specific limitation on the present invention. This is also applicable to the following description.

S220. Transmit uplink data based on the first uplink grant, and start a first timer.

Optionally, before the first timer expires or is stopped, the terminal device may choose not to listen to a PDCCH of a cell, so that a quantity of electricity of the terminal device can be saved. Alternatively, before the first timer expires or is stopped, the terminal device may listen to a PDCCH if necessary.

Specifically, the terminal device may generate a data packet of a corresponding size based on the first uplink grant, select a HARQ process, and transmit uplink data in a subframe of the HARQ process. In this case, the terminal device starts the first timer (an uplink hybrid automatic repeat request round-trip latency timer UL HARQ RTT Timer). When the first timer does not expire, the terminal device may not listen to a PDCCH, so that electricity can be saved.

Optionally, in S220, when the first timer is started, if a second timer does not expire and/or is not stopped, the second timer is stopped.

To be specific, when the terminal device starts the first timer, if the terminal device finds that the second timer does not expire and/or is not stopped, the terminal device stops the second timer, so as to start the second timer after the first timer expires. "The timer expires" indicates that the timer automatically stops when the timer reaches a specified time. "The timer is stopped" indicates that the terminal device or the base station forcibly stops the timer without considering whether the terminal device reaches a specified time.

Optionally, in this embodiment of the present invention, to-be-transmitted uplink data may specifically include data or Msg3. "Data" is corresponding to to-be-transmitted uplink data in a contention-free random access scenario of the terminal device. "Msg" is corresponding to to-be-transmitted uplink data in a contention random access scenario of the terminal device.

Optionally, in the contention-free random access scenario, the terminal device scrambles the uplink data by using a unique cell identifier C-RNTI of the terminal.

Optionally, in the contention random access scenario, the terminal device scrambles the uplink data by using a temporary cell identifier TC-RNTI of the terminal.

It should be understood that in this embodiment of the present invention, a time length of the first timer (UL HARQ RTT Timer) may be specified in a protocol.

This is not limited herein.

S230. Start a second timer after the first timer expires.

Specifically, after the first timer expires or is stopped, the terminal device starts the second timer, to wait for an uplink grant for possible HARQ retransmission or initial transmission of the uplink data.

In this embodiment of the present invention, the second timer is a discontinuous reception uplink retransmission timer DRX-UL retransmission timer.

It should be understood that in this embodiment of the present invention, a time length of the second timer (DRX-UL Retransmission Timer) is set by the base station, and the base station may indicate the time length of the second timer by using an instruction. This is not limited herein.

It should be noted that there may be no association between the time length of the first timer and the time length of the second timer. This is not specifically limited in the present invention.

Optionally, in this embodiment of the present invention, a subframe in which the first timer expires or is stopped may be the same as or different from a subframe in which the second timer is started.

To be specific, the subframe in which the first timer of the terminal device is stopped or expires and the subframe in which the second timer is started may be a same subframe or may be different subframes.

S240. Listen to a physical downlink control channel PDCCH based on the second timer.

The terminal device listens to the PDCCH based on the second timer, to wait for possible HARQ retransmission or initial transmission of the uplink data.

In this embodiment of the present invention, the terminal device transmits the uplink data based on the first uplink grant, and starts the first timer. After the first timer expires, the terminal device starts the second timer. Finally, the terminal device listens to the PDCCH based on the second timer. In this way, electricity can be saved, and a retransmission delay can be reduced.

Optionally, before S210, the method 200 further includes:

A MAC layer of the terminal device selects a plurality of random access resources and a plurality of random access radio network temporary identifiers RA-RNTIs, and submits the plurality of random access resources and the plurality of RA-RNTIs to a physical layer of the terminal device.

The physical layer of the terminal device performs clear channel assessment on at least one channel, to determine a first channel, where the first channel is in an idle mode, the plurality of random access resources include a random access resource corresponding to the first channel, and the plurality of RA-RNTIs include an RA-RNTI corresponding to the first channel; and optionally, the physical layer of the terminal device generates a random access preamble sequence based on a preamble index number of the terminal device.

The physical layer of the terminal device sends the random access preamble sequence to the base station by using the random access resource corresponding to the first channel, and optionally, the random access preamble sequence is used by the terminal device to send a service request to the base station.

The obtaining a first uplink grant sent by a base station includes:

The physical layer of the terminal device receives, by using the RA-RNTI corresponding to the first channel, the MAC message sent by the base station. Optionally, any preamble index field in the MAC message matches the preamble index number of the terminal device.

In specific implementation, the MAC layer of the terminal device notifies the PHY layer of the terminal device of the preamble index number, at least one selected random access resource, and a random access radio network temporary identifier (Random access Radio Network Temporary Identity, RA-RNTI) corresponding to each random access resource. In contention-based random access, the preamble index number is allocated by the base station to the terminal device. Each random access resource may be corresponding to one channel (channel), to be specific, a frequency resource of specific bandwidth. Then, the PHY layer of the terminal device generates the random access preamble sequence based on the preamble index number; determines the first channel, to be specific, a channel in an idle mode, based on a result of clear channel assessment (Clear Channel Assessment, CCA) or listen before talk (Listen Before Talk, LBT) performed on each channel; and sends the random access preamble sequence to the base station by using the random access resource corresponding to the first channel. Finally, the physical layer of the terminal device receives, by using the RA-RNTI corresponding to the first channel, the MAC message sent by the base station.

In this embodiment of the present invention, for example, if it is detected that signal energy received on one or more channels is less than or equal to a specific threshold, the PHY layer of the terminal device selects one idle channel (the first channel) from the one or more channels, and sends the random access preamble sequence to the base station on the idle channel by using a corresponding random access resource. The PHY layer of the terminal device receives the random access response message (the MAC message) based on an RA-RNTI corresponding to the random access resource. For another example, if all the channels are not in an idle mode, the terminal device does not send the random access preamble sequence.

In this way, the base station may deliver the corresponding random access response message (the MAC message) based on the successfully received random access preamble sequence sent by the terminal device. For example, in non-contention-based random access, the base station may find the corresponding terminal device based on the preamble index number, and then deliver the MAC message including the first uplink grant to the terminal device.

Optionally, when calculating an RA-RNTI, the MAC layer of the terminal device needs to consider information such as a channel index corresponding to a random access resource, and a time domain location and a frequency domain location in a corresponding channel.

Optionally, in specific implementation, the MAC layer of the terminal device notifies the physical layer of the terminal device of a selected random access resource, the preamble index number, and a random access radio network temporary identifier (RA-RNTI). Then, the physical layer of the terminal device generates the random access preamble sequence based on the preamble index number, and sends the random access preamble sequence to the base station. Finally, the physical layer of the terminal device receives the random access response message based on the RA-RNTI. The random access response message is the MAC message, and any preamble index field in the MAC message matches the preamble index number of the terminal device.

In contention-based random access, the preamble index number of the terminal device is allocated by the base station to the terminal device. The base station delivers the corresponding random access response message (the MAC message) based on the successfully received random access preamble sequence sent by the terminal device. Any preamble index field in the MAC message matches the preamble index number corresponding to the preamble sequence sent by the terminal device. In other words, a preamble index field included in the MAC message corresponding to the first uplink grant matches the preamble index number of the preamble sequence sent by the terminal device.

In non-contention-based random access, the base station may find the corresponding terminal device based on the preamble index number, and then deliver the MAC message including the first uplink grant to the terminal device.

Optionally, the terminal device may generate the random access preamble sequence based on the preamble index number, and send the random access preamble sequence to the base station. The random access preamble sequence is used by the terminal device to send a service request to the base station. Then, the terminal device receives the MAC message sent by the base station, and any preamble index field in the MAC message matches the preamble index number of the terminal device. Therefore, the terminal device may consider that the base station responds to the service request of the terminal device, so that the terminal device can transmit the uplink data (for example, Msg3 or data) based on the first uplink grant.

Optionally, for a contention-based random access scenario, specific content (for example, initial access, re-establishment, or uplink synchronization) corresponding to the service request is notified to the base station by using subsequent Msg3. For a non-contention-based random access scenario, the service request is used to obtain uplink synchronization.

It should be noted that in contention-based random access, the preamble index number is allocated by the base station to the terminal device. The base station delivers the corresponding random access response message (the MAC message) based on the successfully received random access preamble sequence sent by the terminal device. Any preamble index field in the MAC message matches the preamble index number corresponding to the random access preamble sequence sent by the terminal device. In other words, a preamble index field included in the MAC message corresponding to the first uplink grant matches the preamble index number of the random access preamble sequence sent by the terminal device.

It should be noted that in non-contention-based random access, the base station may find the corresponding terminal device based on the preamble index number, and then deliver the MAC message including the first uplink grant to the terminal device.

In other words, in this embodiment of the present invention, the preamble index number may be selected by the terminal device, or may be specified by the base station for the terminal device.

Optionally, S240 may include:

before the second timer expires and/or is stopped, the MAC layer of the terminal device controls the physical (PHY) layer of the terminal device to listen to the PDCCH.

In this embodiment of the present invention, the terminal device transmits the uplink data based on the first uplink grant, and starts the first timer. After the first timer expires, the terminal device starts the second timer. In this way, electricity can be saved, and the retransmission delay can be reduced.

Optionally, the method 200 further includes:

before the second timer expires or is stopped, if a second uplink grant sent by the base station through the PDCCH is detected through listening, performing hybrid automatic repeat request HARQ retransmission or initial transmission of the uplink data based on an indication of the second uplink grant.

Specifically, before the second timer expires or is stopped, the MAC layer of the terminal device controls the PHY layer of the terminal device to listen to the PDCCH. If the second uplink grant sent by the base station is detected through listening, where the second uplink grant is sent by using the PDCCH and is used to indicate retransmission or initial transmission, the terminal device may perform HARQ retransmission or initial transmission of the uplink data based on the second uplink grant. Optionally, when performing HARQ retransmission of the uplink data, the terminal device may start the first timer, and repeat the foregoing operations.

Therefore, according to the hybrid automatic repeat request method in this embodiment of the present invention, the terminal device transmits the uplink data based on the first uplink grant, and starts the first timer. After the first timer expires, the terminal device starts the second timer. Before the second timer expires and/or is stopped, the terminal device detects, through listening, the second uplink grant sent by the base station through the PDCCH. In this way, electricity can be saved, and the retransmission delay can be reduced. Further, the terminal device can perform HARQ retransmission of the uplink data based on the second uplink grant detected through listening.

Optionally, the method 200 further includes:

after the second timer expires or is stopped, if a second uplink grant sent by the base station through the PDCCH fails to be detected through listening, determining, based on current discontinuous reception DRX status information of the terminal device, whether to continue to listen to the PDCCH.

Specifically, after the second timer expires or is stopped, if the terminal device has not detected, through listening, the second uplink grant delivered by the base station, the terminal device may determine, based on the current DRX status information or a parameter, whether to continue to listen to the PDCCH. For example, after the DRX-UL retransmission timer expires and/or is stopped, the terminal device may select, based on the current discontinuous reception DRX status information, whether to enter a DRX dormant period. If all conditions of the DRX status information required for listening to the PDCCH are met, the terminal device may continue to listen to the PDCCH. If any condition of the DRX status information required for listening to the PDCCH is not met, the terminal device may choose to enter the DRX dormant period and do not listen to the PDCCH.

Optionally, in an embodiment, S220 may include:

transmitting the uplink data for a plurality of times based on the first uplink grant; and starting the first timer and/or a third timer in a subframe of last transmission in the plurality of times of transmission of the uplink data, where the third timer is configured to wait for the base station to send a contention resolution message.

Specifically, after a technology of repeated sending (Repetition) is introduced, the terminal device may transmit the uplink data for a plurality of times, in other words, transmit a bundle (bundle) of uplink data. Then, the terminal device may start the first timer and/or the third timer in the subframe of last transmission in the plurality of times of transmission. The third timer is configured to wait for the base station to send the contention resolution message.

In this embodiment of the present invention, the third timer is a MAC-contention resolution timer (MAC-Contention resolution Timer), and the third timer is introduced for the contention random access scenario, and is mainly configured to wait for the base station to send the contention resolution message.

Optionally, a quantity of times the uplink data is transmitted may be indicated by using the first uplink grant.

It should be understood that the quantity of transmission times is not specifically limited in this embodiment of the present invention.

Therefore, according to the hybrid automatic repeat request method in this embodiment of the present invention, the terminal device transmits the uplink datatransmits the uplink data for a plurality of times based on the first uplink grant, and starts the first timer and/or the third timer in the subframe of last transmission in the plurality of times of transmission of the uplink data. After the first timer expires, the terminal device starts the second timer, and listens to the PDCCH based on the second timer. In this way, electricity can be saved, and the retransmission delay can be reduced. Further, transmission is performed a plurality of times, so that a success rate of data transmission can be improved, and a coverage range can be increased.

Optionally, for HARQ retransmission of the uplink data, repetition may also be introduced for performing transmission a plurality of times. For brevity, details are not described herein.

Optionally, the method 200 further includes:

before the third timer expires and/or is stopped, receiving the contention resolution message sent by the base station, where the contention resolution message indicates that random access contention of the terminal device succeeds; and stopping the second timer based on the contention resolution message.

Specifically, for the contention random access scenario, before the third timer (MAC-Contention resolution Timer) expires and/or is stopped, the terminal device may receive the contention resolution message sent by the base station. After receiving the contention resolution message, the terminal device may consider that random access succeeds, so as to stop the second timer (DRX-UL Retransmission Timer) that is configured to listen to retransmission.

Optionally, the contention resolution message may be scrambled by using the unique cell identifier C-RNTI of the terminal device, or may be scrambled by using the temporary cell identifier TC-RNTI of the terminal device. Specifically, which information is used for scrambling depends on whether the terminal device currently has the C-RNTI.

Therefore, according to the hybrid automatic repeat request method in this embodiment of the present invention, the terminal device transmits the uplink data based on the first uplink grant, and starts the first timer. After the first timer expires, the terminal device starts the second timer. In this way, electricity can be saved, and the retransmission delay can be reduced.

Figure 3:
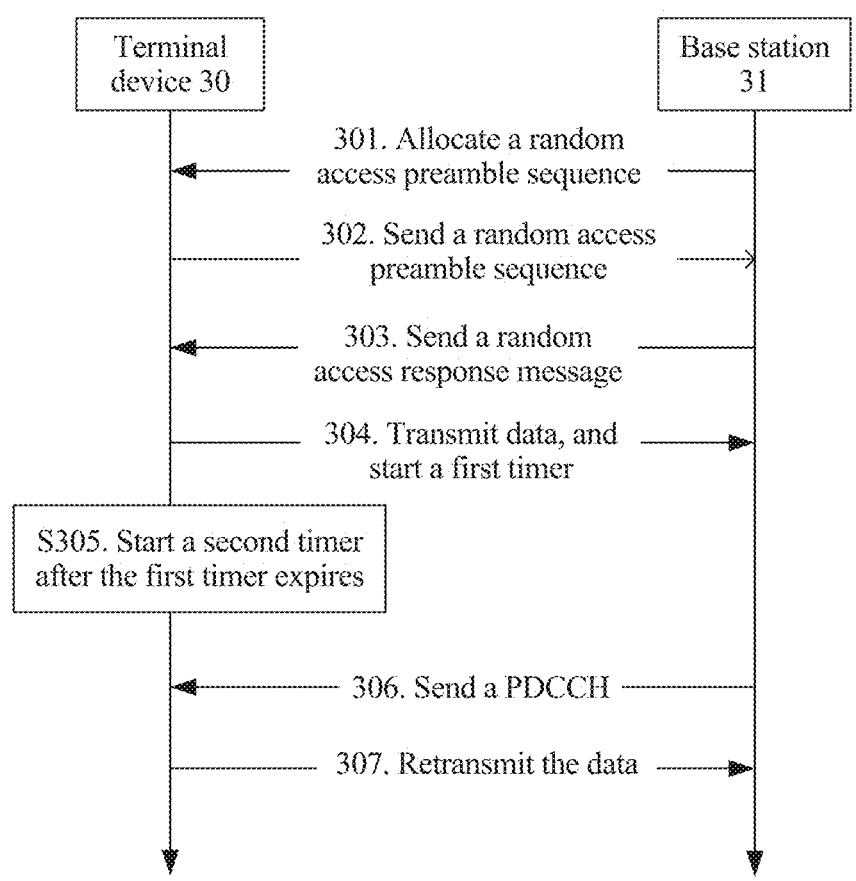
FIG. 3 is a schematic diagram of an example of a hybrid automatic repeat request method according to an embodiment of the present invention.

To make a person skilled in the art understand the technical solutions in the present invention, the following describes the embodiments of the present invention with reference to a contention-free random access scenario in FIG. 3. It should be understood that only an example is provided for description herein, and this does not constitute a limitation on the present invention.

For example, FIG. 3 is a schematic diagram of an example of a hybrid automatic repeat request method according to an embodiment of the present invention. As shown in FIG. 3, in this embodiment of the present invention, a non-contention-based random access scenario between a terminal device 30 and a base station 31 mainly includes the following steps.

S301. The base station 31 allocates a random access preamble sequence.

The base station 31 may allocate a random access preamble sequence (preamble) to the terminal device 30. The random access preamble sequence includes a preamble index number allocated by the base station 31 to the terminal device 30. Optionally, the base station 31 may allocate the random access preamble sequence to the terminal device 30 in two manners. In a first manner, the base station 31 allocates the random access preamble sequence to the terminal device 30 by using a PDCCH order (order). In a second manner, the random access preamble sequence is carried in a handover message, and the handover message is an RRC message. The first manner is a general case, and the second manner is mainly for a handover scenario.

S302. The terminal device 30 sends a random access preamble sequence to the base station 31.

The terminal device 30 may generate the random access preamble sequence based on the preamble index number allocated by the base station 31 to the terminal device 30, and send the random access preamble sequence to the base station 31.

Optionally, the terminal device 30 determines an RA-RNTI based on a resource location of the preamble index number. For example, RA-RNTI=1+t_id+10*f_id, where t_id is a time domain resource location of a PRACH resource, and f_id is a frequency domain location of the PRACH resource.

S303. The base station 31 sends a random access response message to the terminal device 30.

The base station 31 may generate the random access response message (Random Access Response, RAR) based on the random access preamble sequence sent by the terminal device 30, and send the random access response message to the terminal device 30. The random access response message is a MAC message that is transmitted on a physical downlink shared channel (Physical Downlink Shared Channel, PDSCH) and that is scrambled by using the RA-RNTI. The random access response message includes a first uplink grant.

S304. The terminal device 30 transmits data and starts a first timer.

The terminal device 30 generates a data packet of a corresponding size based on the first uplink grant in the random access response message, selects a HARQ process (process) such as a HARQ process 0, and transmits uplink data (Data) in a subframe indicated by the first uplink grant. The terminal device scrambles the uplink data (Data) by using a C-RNTI for transmission. In this case, the terminal device starts the first timer (UL HARQ RTT Timer). Before the first timer expires, the terminal device may not need to listen to a PDCCH of a cell, so that electricity is saved.

S305. The terminal device 30 starts a second timer after the first timer expires.

After the first timer expires, the terminal device 30 may start the second timer (DRX-UL Retransmission Timer), to detect, through listening, whether there is an uplink grant corresponding to a HARQ of to-be-transmitted data in the PDCCH. Each HARQ process includes a first timer and a second timer.

S306. The base station 31 sends a PDCCH to the terminal device 30.

Before the second timer expires or is stopped, the base station 31 sends the PDCCH to the terminal device 30. The PDCCH includes a second uplink grant used to retransmit the data.

S307. The terminal device 30 retransmits the data.

Before the second timer expires or is stopped, the terminal device 30 successfully receives the second uplink grant used to retransmit the data, and retransmits the data based on the second uplink grant.

Optionally, after S307, the terminal device 30 may repeatedly perform "start a first timer" in step S304 and "start a second timer after the first timer expires" in step S305.

Therefore, in this example, for the non-contention-based random access scenario, the terminal device 30 starts the first timer, and does not need to listen to the PDCCH within duration of the first timer, so that electricity can be saved. Further, the terminal device 30 starts the second timer after the first timer expires, to wait for the uplink grant for possible retransmission, so that a retransmission delay can be reduced.

Optionally, in an embodiment, when the random access response message is a contention-based random access response message, the uplink data includes a message Msg3, and the Msg3 is scrambled by using a temporary cell identifier TC-RNTI of the terminal.

Specifically, for a contention-based random access scenario, after receiving the random access response message sent by the base station, the terminal device performs uplink transmission, to be specific, sends the Msg3. The Msg3 is scrambled by using the temporary cell identifier TC-RNTI of the terminal. The TC-RNTI is delivered by using the random access response message. In this case, the terminal device starts the first timer. Similarly, before the first timer expires or is stopped, the terminal device may choose not to listen to the PDCCH, to save electricity for the terminal device.

Optionally, in an embodiment, the method further includes:

receiving a contention resolution message sent by the base station, where the contention resolution message indicates that random access contention of the terminal device succeeds; and stopping the second timer based on the contention resolution message.

Specifically, for the contention random access scenario, the terminal device may further receive the contention resolution message (contention resolution) sent by the base station. The contention resolution message indicates that the random access contention of the terminal succeeds. Generally, the terminal device considers that the random access contention succeeds provided that the contention resolution message is received. In this case, the terminal device may stop the second timer based on the contention resolution message.

Optionally, the contention resolution message may be scrambled by using the TC-RNTI or the C-RNTI.

Figure 4:
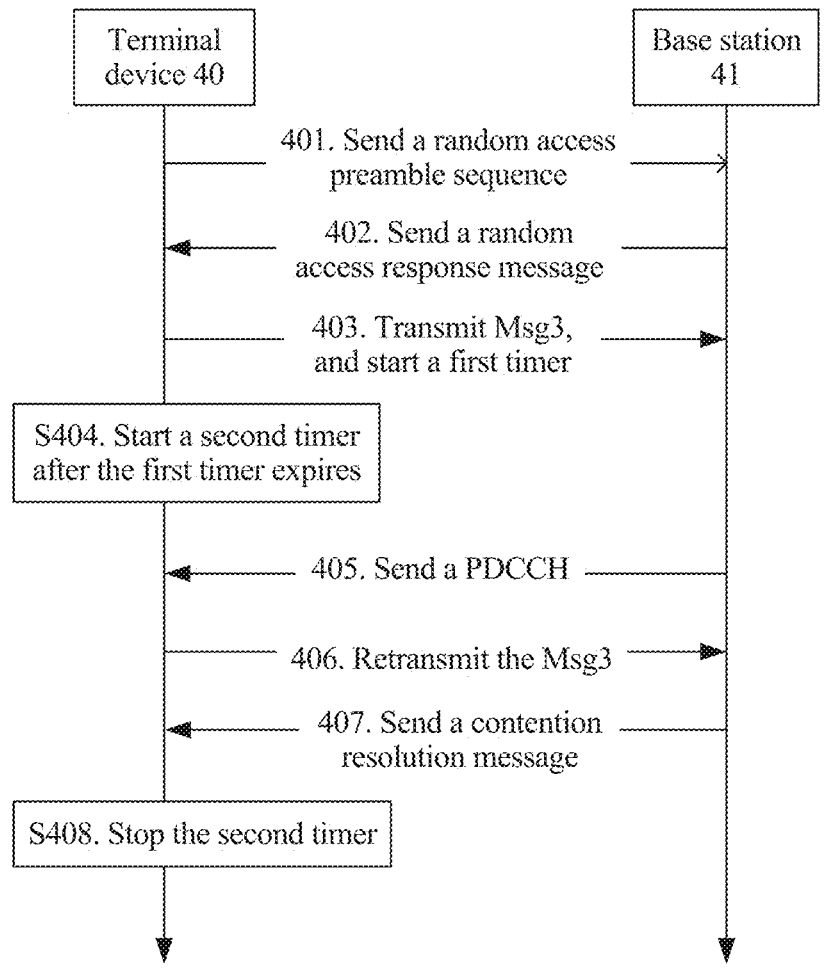
FIG. 4 is a schematic diagram of another example of a hybrid automatic repeat request method according to an embodiment of the present invention.

To make a person skilled in the art understand the technical solutions in the present invention, the following describes the embodiments of the present invention with reference to a contention random access scenario in FIG. 4. It should be understood that only an example is provided for description herein, and this does not constitute a limitation on the present invention.

For example, FIG. 4 is a schematic diagram of another example of a hybrid automatic repeat request method according to an embodiment of the present invention. As shown in FIG. 4, in this embodiment of the present invention, a contention random access scenario between a terminal device 40 and a base station 41 mainly includes the following steps.

S401. The terminal device 40 sends a random access preamble sequence to the base station 41.

The terminal device 40 randomly selects a preamble index number, generates the random access preamble sequence based on the selected preamble index number, and sends the random access preamble sequence to the base station 41.

S402. The base station 41 sends a random access response message to the terminal device 40.

The base station 41 generates the random access response message based on the received random access preamble sequence, and then sends the random access response message to the terminal device 41. Similarly, the random access response message may be a MAC message that is transmitted on a PDSCH and that is scrambled by using an RA-RNTI. The random access response message includes a first uplink grant.

S403. The terminal device 40 transmits Msg3 and starts a first timer.

The terminal device 40 generates a data packet of a corresponding size based on the first uplink grant in the random access response message, selects a HARQ process (process) such as a HARQ process 0, and performs uplink transmission in a subframe indicated by the first uplink grant, to be specific, sends the Msg3. The terminal device scrambles the Msg3 by using a TC-RNTI, and the TC-RNTI is delivered by using the random access response message. In this case, the terminal device starts the first timer (UL HARQ RTT Timer). Before the first timer expires or is stopped, the terminal device may not need to listen to a PDCCH of a cell, so that electricity is saved.

S404. The terminal device 40 starts a second timer after the first timer expires.

After the first timer expires, the terminal device 40 may start the second timer (DRX-UL Retransmission Timer), to detect, through listening, whether there is an uplink grant corresponding to a HARQ of to-be-transmitted data in the PDCCH. Each HARQ process includes a first timer and a second timer.

S405. The base station 41 sends a PDCCH to the terminal device 40.

Before the second timer expires or is stopped, the base station 41 sends the PDCCH to the terminal device 40. The PDCCH includes a second uplink grant used to retransmit the Msg3.

S406. The terminal device 40 retransmits the Msg3.

Before the second timer expires, the terminal device 40 successfully receives the second uplink grant used to retransmit the Msg3, and retransmits the Msg3 based on the second uplink grant.

Optionally, after S406, the terminal device 40 may repeatedly perform "start a first timer" in step S403 and "start a second timer after the first timer expires" in step S404.

In S403 and S406, regardless of whether the Msg3 is initially transmitted or the Msg3 is retransmitted, a MAC layer of the terminal device needs to start or restart a third timer (MAC-Contention Resolution Timer) in a subframe in which the Msg3 is transmitted.

S407. The base station 41 sends a contention resolution message to the terminal device.

Optionally, if the base station 41 successfully receives the data, there is no need to send, to the terminal device 40, the uplink grant used to retransmit the Msg3. In this case, the base station 41 sends the contention resolution message (contention resolution) to the terminal device.

Optionally, if the UE has a C-RNTI, the C-RNTI is used to scramble the contention resolution message. If the UE has the TC-RNTI, the TC-RNTI is used to scramble the contention resolution message.

S408. The terminal device 40 stops the second timer.

After receiving the contention resolution message sent by the base station 41, the terminal device 40 may consider that random access succeeds. In this case, the terminal device 40 may stop the second timer and stop the third timer.

Therefore, in this example, for the contention random access scenario, the terminal device 40 starts the first timer, and does not need to listen to the PDCCH within duration of the first timer, so that electricity can be saved. Further, the terminal device 40 starts the second timer after the first timer expires, to wait for the uplink grant for possible retransmission, so that a retransmission delay can be reduced.

Optionally, in an embodiment, S403 may include:

performing transmission of the Msg3 a plurality of times based on the first uplink grant; and starting the first timer and/or a media access control MAC timer in a subframe of last transmission in the plurality of times of transmission of the Msg3.

Specifically, for transmission of the Msg3, repeated sending (Repetition) may be introduced, to be specific, a bundle (bundle) of Msg3 is repeatedly sent, to improve a data transmission success rate and increase a coverage range. After a technology of repeated sending is introduced, the terminal device may perform transmission of the Msg3 a plurality of times based on the first uplink grant, and start the first timer and/or the third timer (MAC-Contention Resolution Timer) in the subframe of last transmission in the plurality of times of transmission. The first uplink grant for transmission of the bundle of Msg3 may be delivered by using the RAR, or may be delivered by using the PDCCH.

Optionally, a HARQ of retransmitting the Msg3 by the terminal device based on the second uplink grant may also be HARQ retransmission of repeatedly sending the Msg3, and the first timer and the third timer are started in the subframe of last retransmission in the plurality of times of retransmission. The second uplink grant for retransmission of a bundle of Msg3 can be delivered only by using the PDCCH.

Figure 5:
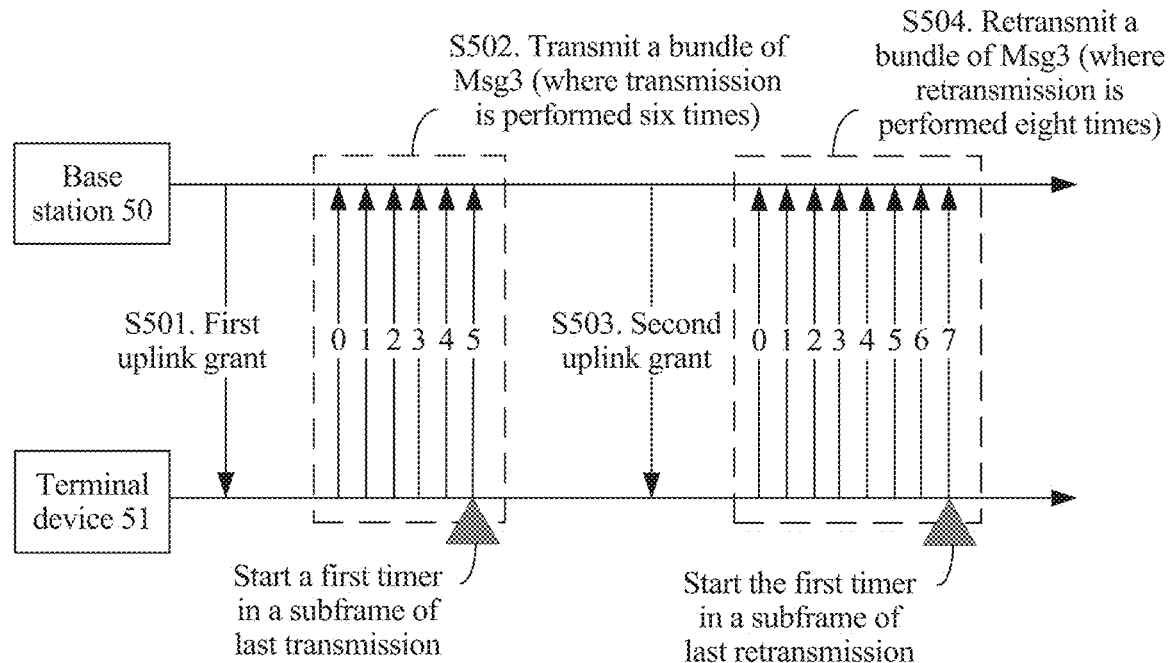
FIG. 5 is a schematic diagram of still another example of a hybrid automatic repeat request method according to an embodiment of the present invention.

To describe a procedure of repeated sending more intuitively, the following provides detailed description with reference to FIG. 5.

As shown in FIG. 5, the procedure of repeated sending includes the following steps.

S501. A base station 50 sends a first uplink grant to a terminal device 51.

During data transmission, the base station 50 may send the first uplink grant to the terminal device 51. The first uplink grant is used to transmit Msg3. The first uplink grant may be delivered by using an RAR, or may be delivered by using a PDCCH.

S502. The terminal device 51 transmits a bundle of Msg3 (where transmission is performed six times).

The terminal device 51 repeatedly transmits the Msg3 to the base station six times (number 0 to 5), and the terminal device 51 starts a first timer and starts a MAC layer-contention resolution timer in a subframe of last transmission (number 5) of the Msg3.

It should be understood that six times of repeated sending are merely used as an example for description. A specific quantity of times of repeated sending may be indicated by using an uplink grant, and the quantity of times of repeated sending is not specifically limited.

S503. The base station 50 sends a second uplink grant to the terminal device 51.

During data retransmission, the base station 50 may send the second uplink grant to the terminal device 51. The second uplink grant is used to retransmit the Msg3. The second uplink grant can be delivered only by using the PDCCH.

S504. The terminal device 51 retransmits a bundle of Msg3 (where retransmission is performed eight times).

The terminal device 51 repeatedly retransmits the Msg3 to the base station eight times (number 0 to 7), and the terminal device 51 starts the first timer and/or the third timer in a subframe of last retransmission (number 7) of the Msg3.

It should be understood that eight times of retransmission herein are merely used as an example for description. A specific quantity of retransmission times may be indicated by using an uplink grant, and the quantity of retransmission times is not specifically limited.

It should be further understood that the quantity of transmission times (six times) and the quantity of retransmission times (eight times) of the Msg3 herein may be independent. This is not specifically limited herein.

Therefore, in this embodiment of the present invention, a mechanism of repeated sending is introduced, so that a success rate of data transmission can be improved, and a coverage range can be increased. The mechanism of repeated sending is particularly applicable to a specific type of UE, for example, UE in a Narrowband Internet of Things (Narrowband Internet of Things, NB-IoT), and UE in machine type communication (Machine Type Communication, MTC).

It should be understood that schematic diagrams of FIG. 3 to FIG. 5 are merely intended to facilitate understanding of the technical solutions in the present invention, and do not constitute a limitation on the present invention.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes related embodiments of starting or stopping a timer by a terminal device when the terminal device listens to a PDCCH, and the following describes related embodiments of feeding back a receiving status of downlink data by a terminal device.

Specifically, when the terminal device needs to feed back a data receiving status, the terminal device can feed back a feedback status of only one HARQ process in one subframe. Consequently, uplink and downlink traffic cannot be properly adapted in uplink and downlink subframes. Based on this, an embodiment of the present invention provides a solution: The terminal device feeds back feedback information of a plurality of HARQ processes in one subframe. The following provides detailed description.

Optionally, in an embodiment, the present invention provides a hybrid automatic repeat request method, and the method includes:

determining a hybrid automatic repeat request HARQ process controller;

generating, based on the HARQ process controller, feedback information corresponding to a plurality of HARQ processes; and sending the feedback information to a base station, where the feedback information is transmitted by using a media access control MAC message.

Specifically, a terminal device may introduce the HARQ process controller at a MAC layer, and then generate, based on the HARQ process controller, the feedback information corresponding to the plurality of HARQ processes. Finally, the terminal device feeds back, in a same subframe to the base station, the Feedback information corresponding to the plurality of HARQ processes.

In this embodiment of the present invention, the terminal device determines the HARQ process controller, and feeds back, in the same subframe, the feedback information of the plurality of HARQ processes, to better adapt uplink and downlink traffic.

In this embodiment of the present invention, the feedback information is sent by using a MAC message. Optionally, a sending time of the MAC message depends on an uplink transmission resource allocated by the base station to the terminal device.

Figure 6:
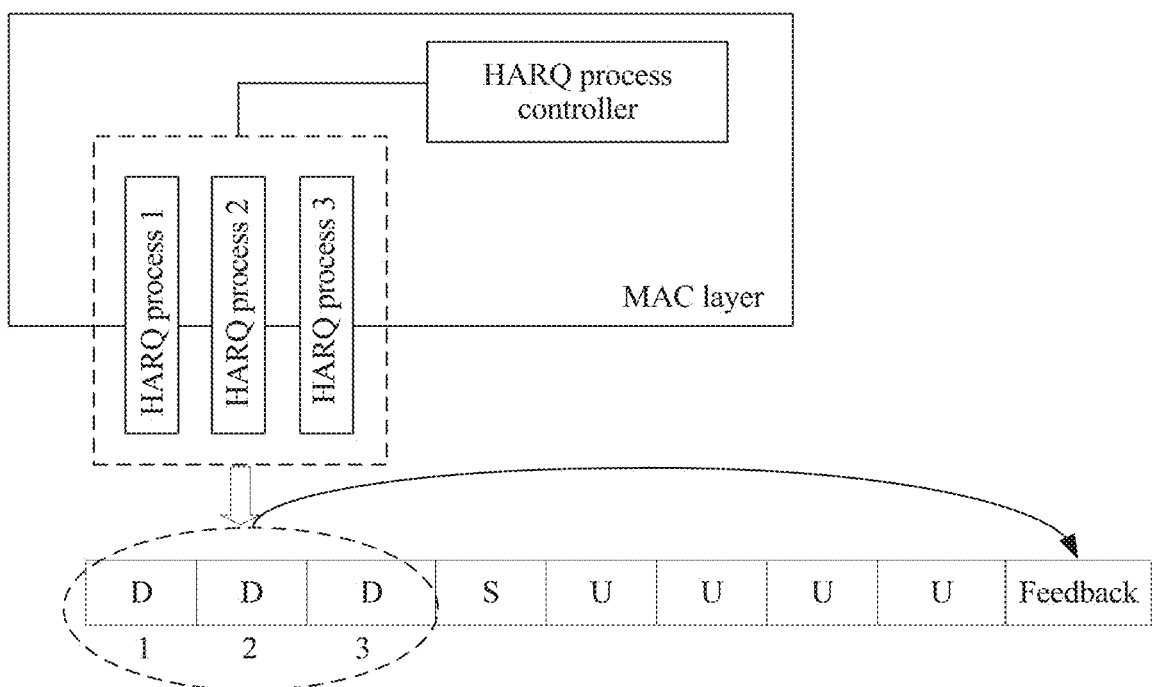
FIG. 6 is a schematic diagram of an example of a hybrid automatic repeat request process controller according to an embodiment of the present invention.

The following provides detailed description with reference to FIG. 6. FIG. 6 is a schematic diagram of an example of a hybrid automatic repeat request process controller according to an embodiment of the present invention. As shown in FIG. 6, a terminal device introduces a HARQ process controller at a MAC layer. The HARQ process controller is configured to generate feedback information of a HARQ process 1, aHARQ process 2, and aHARQ process 3. The HARQ process 1, the HARQ process 2, and the HARQ process 3 are respectively corresponding to a subframe 1, a subframe 2, and a subframe 3 of downlink transmission data. After receiving downlink data, the terminal device needs to feed back a receiving status of the downlink data. Specifically, after receiving a PDCCH, the terminal device triggers Feedback to perform feedback. Herein, the terminal device may feed back the feedback information of the HARQ process 1, the HARQ process 2, and the HARQ process 3 in a same subframe (a subframe in which the Feedback is located in FIG. 6).

Optionally, a possible format of the HARQ process controller is specifically shown in the following Table 1.

| $C_7$ | $C_6$ | $C_5$ | $C_4$ | $C_3$ | $C_2$ | $C_1$ | $C_0$ |
|---|---|---|---|---|---|---|---|
| $C_{15}$ | $C_{14}$ | $C_{13}$ | $C_{12}$ | $C_{11}$ | $C_{10}$ | $C_9$ | $C_8$ |

Table 1 shows 16 bits (bit). Each bit represents one HARQ process, and 0 or 1 is used to identify a feedback status on each bit. For example, 0 indicates that receiving fails, and 1 indicates that receiving succeeds. For example, for the feedback information of the HARQ process 1, the HARQ process 2, and the HARQ process 3 corresponding to three pieces of downlink data in FIG. 6, $C_0$ to $C_2$ in Table 1 may be used to respectively represent feedback information of each piece of downlink data.

In specific implementation, after receiving an uplink grant, the terminal device may generate a HARQ control element (Control Elements, CE) at the MAC layer. The HARQ CE is feedback information corresponding to each piece of downlink data. Then, the terminal device instructs a multiplexing and assembly module (Multiplexing and assembly) to combine, into one MAC protocol data unit (Protocol Data Unit, PDU), the feedback information corresponding to each piece of downlink data, and submit the MAC protocol data unit to a physical layer for transmission.

Optionally, to trigger a feedback status in time, the terminal device may introduce a periodic timer. The terminal device triggers a terminal device to feed back a feedback status of a HARQ process provided that the periodic timer expires or is stopped.

Optionally, a base station may also trigger, by using an uplink grant, a terminal device to feed back a feedback status of a HARQ process. Optionally, to avoid repeatedly triggering a feedback status, the terminal device may also introduce a prohibit timer. After the prohibit timer expires, the terminal device can trigger the feedback status again.

Therefore, in this embodiment of the present invention, the terminal device determines the HARQ process controller, and feeds back, in one subframe, feedback information of a plurality of HARQ processes, to better adapt uplink and downlink traffic.

Optionally, in this embodiment of the present invention, a cell may be an unlicensed (unlicensed) spectrum cell or a licensed (licensed) spectrum cell.

Optionally, in an embodiment, for the unlicensed spectrum cell, this embodiment of the present invention provides a new power headroom formula (type2 power headroom), to apply to power headroom existing when a PUCCH and a PUSCH are simultaneously transmitted. A specific method includes:

receiving configuration information sent by a base station, where the configuration information is used to configure an unlicensed spectrum secondary serving cell;

triggering, by a MAC layer of a terminal device, power headroom report PHR;

determining, by a PHY layer of the terminal device, type2 power headroom of a licensed primary serving cell based on a received uplink grant delivered by the base station, where the type2 power headroom represents power headroom existing when a physical uplink control channel PUCCH and a physical uplink shared channel PUSCH are simultaneously transmitted;

notifying, by the PHY layer of the terminal device, the MAC layer of the terminal device of the determined type2 power headroom of the licensed primary serving cell; and generating, by the MAC layer of the terminal device, a MAC control element of the PHR based on the type2 power headroom of the licensed primary serving cell.

The terminal device needs to support simultaneous transmission of a PUCCH of the licensed primary serving cell and a PUSCH of an unlicensed cell, and configuration of the simultaneous transmission does not depend on configuration of simultaneous transmission of a PUCCH and a PUSCH of a licensed cell.

Specifically, the MAC layer of the terminal device triggers the power headroom report (Power headroom report, PHR). A trigger condition may include that a periodic timer is triggered, a path loss variation exceeds a specific threshold, and the like. Then, the PHY layer of the terminal device obtains, through calculation, the type2 power headroom of the licensed primary serving cell based on the received uplink grant. Compared with type1 power headroom (power headroom existing when only a PUSCH is transmitted), the type2 power headroom represents the power headroom existing when the physical uplink control channel (Physical Uplink Control Channel, PUCCH) and the PUSCH are simultaneously transmitted. The PHY layer of the terminal device sends the determined type2 power headroom to the MAC layer of the terminal device. Finally, the MAC layer of the terminal device generates the MAC control element (Medium access control Control Elements, CE) of the PHR based on the type2 power headroom of the licensed primary serving cell. The MAC CE includes the type2 power headroom.

In this embodiment of the present invention, the type2 power headroom formula is introduced, so that transmit power headroom existing when the PUCCH and the PUSCH are simultaneously transmitted can be determined by using the type2 power headroom formula.

Optionally, in this embodiment of the present invention, the type2 power headroom may be specifically represented by using the following formula:

$$PH_{type2}(i) = P_{CMAX,c}(i) - 10\log_{10}$$

$$\left( \begin{array}{l} 10^{(10\log_{10}(M_{PUSCH,c}(i))+P_{O\_PUSCH,c}(i)+\alpha_c(j)PL_c+\Delta_{TF,c}(i)+f_c(i))/10} + \\ 10^{(P_{O\_PUCCH}+PL_c+h(n_{CQI},n_{HARQ},n_{SR})+\Delta_{F\_PUCCH}(F)+\Delta_{TxD}(F')+g(i))/10} \end{array} \right),$$

where $P_{CMAX,c}(i)$ is maximum transmit power of the terminal in a subframe i in a current serving cell c. $M_{PUSCH,c}(i)$ is bandwidth of a PUSCH and is in a unit of RB. $P_{O\_PUSCH,c}(j)$ is expected power when a single RB is received, and a value of $P_{O\_PUSCH,c}(j)$ is controlled by an upper-layer parameter based on different values of (j∈{0, 1, 2}); α_c(j) is a path loss compensation factor; $PL_c$ is downlink path loss estimation and is in a unit of dB; $\Delta_{TF,c}(i)$ is transmit power offset, and reflects that different modulation formats require different signal to interference plus noise ratios (Signal to Interference plus Noise ratio, "SINR" for short) in PUSCH transmission; and $f_c(i)$ is a current PUSCH power control adjustment status. The parameter $\Delta_{TF,c}(i)$ is defined in a standard:

$$\Delta_{TF,c}(i)=10\log_{10}(2^{1.25 \cdot BPRE(i)}-1), \text{where}$$

$$BPRE(i)=O_{UCI}(i)/N_{RE}(i), \text{where}$$

$O_{UCI}(i)$ is a quantity of bits for transmitting hybrid automatic repeat request feedback (Hybrid automatic repeat request-Acknowledgment, "HARQ-ACK" for short)/scheduling request (Scheduling Request, "SR" for short)/rank indicator (Rank Indicator, "RI" for short)/channel quality indicator (Channel Quality Indicator, "CQI" for short)/precoding matrix indicator (Precoding Matrix Indicator, "PMI" for short) information in a PUCCH format 4/5. $N_{RE}(i)$ is a quantity of resource elements (Resource element, "RE" for short) in a subframe i. When a PUCCH uses the format 4, $N_{RE}(i)=M_{PUCCH,c}(i) \cdot N_{sc}^{RB} \cdot N_{symb}^{PUCCH}$. When a PUCCH uses the format 5, $N_{RE}(i)=N_{sc}^{RB} \cdot N_{symb}^{PUCCH}/2$. $N_{sc}^{RB}$ is a quantity of subcarriers included in one RB, and $N_{symb}^{PUCCH}$ is a quantity of symbols included in a PUCCH channel. $P_{O\_PUCCH}$ may be considered as power expected by the base station when a single resource block (Resource Block, "RB" for short) is received, and $P_{O\_PUCCH}$ is related to intensity of noise and interference of an uplink. $h(n_{CQI}, n_{HARQ}, n_{SR})$ is related to a PUCCH format, and different PUCCH formats are corresponding to different values. A value of $\Delta_{F\_PUCCH}(F)$ is controlled by an upper layer, and the value of $\Delta_{F\_PUCCH}(F)$ is related to a format used by a PUCCH. A PUCCH format 1a is usually used as a reference. A parameter $\Delta_{TxD}(F')$ is related to transmit diversity, and is valid only when a PUCCH is sent on two antenna ports. Otherwise, a value of the parameter is 0. g(i) is a current PUCCH power control adjustment status.

Therefore, in this embodiment of the present invention, the type2 power headroom formula is introduced, so that the transmit power headroom existing when the PUCCH and the PUSCH are simultaneously transmitted can be determined according to the type2 power headroom formula.

Optionally, in an embodiment, a PHY layer of a terminal device receives an uplink grant sent by a base station, where the uplink grant is used to schedule transmission of uplink data in a plurality of subframes.

The PHY layer of the terminal device generates a plurality of uplink grants based on the uplink grant, and sends the plurality of uplink grants to a MAC layer of the terminal device by using at least one subframe.

The PHY layer of the terminal device transmits the uplink datatransmits the uplink data for a plurality of times in the plurality of subframes based on the plurality of uplink grants.

In this embodiment of the present invention, the PHY layer of the terminal device may divide, into a plurality of uplink grants, one received uplink grant that is used to schedule uplink transmission in a plurality of subframes), and submit the plurality of uplink grants to the MAC layer. Then, the MAC layer of the terminal device instructs, based on the plurality of uplink grants submitted by the PHY layer of the terminal device, the PHY layer of the terminal device to perform uplink transmission a plurality of times in different subframes.

Specifically, the PHY layer of the terminal device receives one uplink grant sent by the base station. The uplink grant is used to schedule uplink transmission in a plurality of subframes. The uplink grant includes uplink transmission resources that are of the plurality of uplink subframes and that are allocated by the base station to the terminal device, and the uplink transmission resources may be specifically information such as time-frequency resource information, modulation and coding scheme (Modulation and Coding Scheme, MCS) information, and a HARQ process identifier (ID). The plurality of uplink subframes may be continuous, or may be discontinuous. The PHY layer of the terminal device may generate a plurality of uplink grants based on one received uplink grant, and submit the plurality of uplink grants to the MAC layer of the terminal device in a plurality of subframes or in a same subframe. The physical layer of the terminal device may indicate HARQ information of each uplink subframe. For example, the HARQ information includes at least one of HARQ process ID information, MCS information, transport block size (transport block size, TBS) information, and new data indicator (New Data Indicator, NDI) information that are used. One HARQ process is corresponding to one transmission time interval (Transmission Time Interval, TTI). In addition, the PHY layer of the terminal further needs to indicate a TTI or a subframe in which uplink transmission of an uplink grant of the MAC layer is performed.

Then, the terminal device performs uplink transmission in a HARQ process corresponding to each uplink grant, starts a corresponding timer (UL RTT, UL HARQ RTT Timer), and repeats the foregoing steps. Details are not described herein again.

Therefore, the PHY layer of the terminal device may generate a plurality of uplink grants based on one received uplink grant, and submit the plurality of uplink grants to the MAC layer of the terminal device in a plurality of subframes or in a same subframe.

Figure 7A:
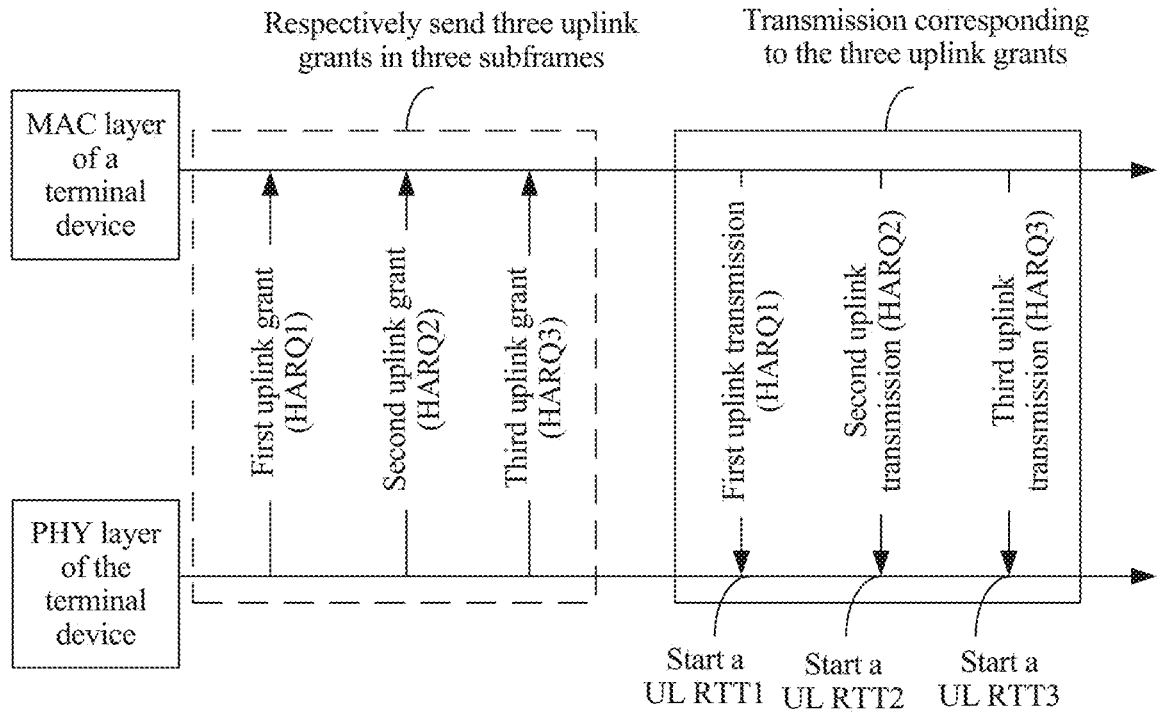
FIG. 7A is a schematic diagram of an example of a transmission process of a physical layer and a MAC layer in a terminal device according to an embodiment of the present invention.

For example, FIG. 7A is a schematic diagram of an example of a transmission process of a PHY layer and a MAC layer in a terminal device. As shown in FIG. 7A, the PHY layer of the terminal device separately sends three uplink grants to the MAC layer in three subframes, and the three uplink grants are respectively a first uplink grant (indicating HARQ information 1) corresponding to a HARQ process 1, a second uplink grant (indicating HARQ information 2) corresponding to a HARQ process 2, and a third uplink grant (indicating HARQ information 3) corresponding to a HARQ process 3. Then, the MAC layer performs uplink transmission based on the three uplink grants, and starts corresponding timers (UL RTT). The timers are respectively a UL RTT1 corresponding to the HARQ process 1, a UL RTT2 corresponding to the HARQ process 2, and a UL RTT3 corresponding to the HARQ process 3.

Figure 7B:
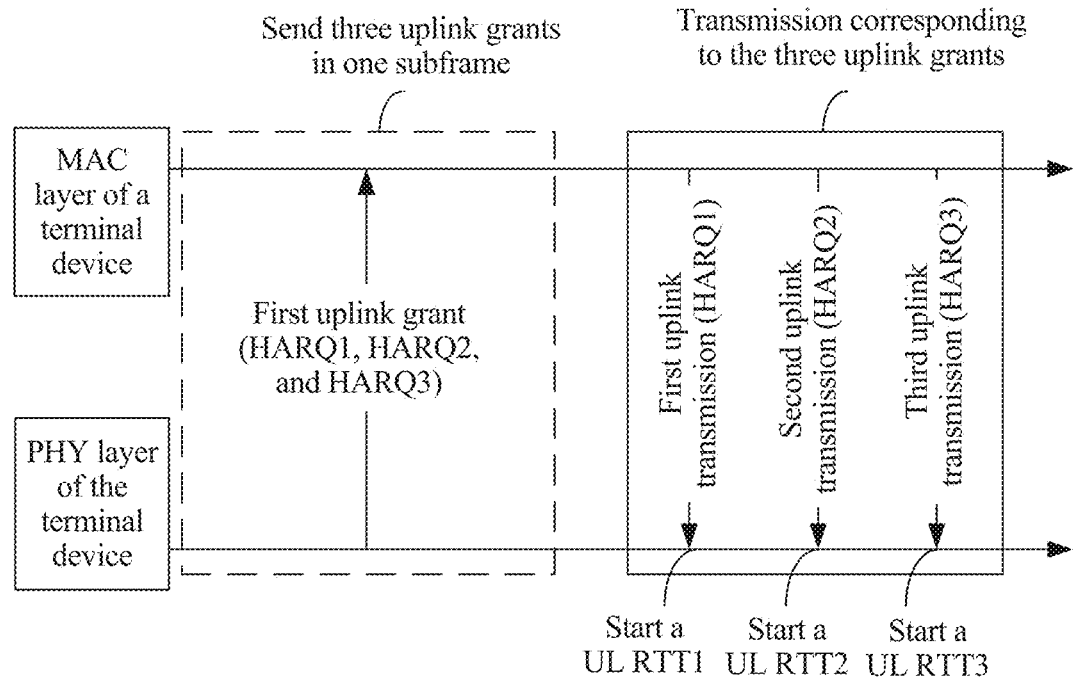
FIG. 7B is a schematic diagram of another example of a transmission process of a physical layer and a MAC layer in a terminal device according to an embodiment of the present invention.

For example, FIG. 7B is a schematic diagram of another example of a transmission process of a PHY layer and a MAC layer in a terminal device. As shown in FIG. 7B, the PHY layer of the terminal device sends three uplink grants to the MAC layer in a same subframe, and the three uplink grants are respectively a first uplink grant (indicating HARQ information 1) corresponding to a HARQ process 1, a second uplink grant (indicating HARQ information 2) corresponding to a HARQ process 2, and a third uplink grant (indicating HARQ information 3) corresponding to a HARQ process 3. Then, the MAC layer performs uplink transmission based on the three uplink grants, and starts corresponding timers (UL RTT). The timers are respectively a UL RTT1 corresponding to the HARQ process 1, a UL RTT2 corresponding to the HARQ process 2, and a UL RTT3 corresponding to the HARQ process 3.

Therefore, the PHY layer of the terminal device may generate a plurality of uplink grants based on one received uplink grant, and submit the plurality of uplink grants to the MAC layer of the terminal device in a plurality of subframes or in a same subframe.

Optionally, in an embodiment, the PHY layer of the terminal may submit one received uplink grant to the MAC layer of the terminal, and indicate a specific subframe or TTI in which the uplink grant is used for uplink transmission and a HARQ process used for the uplink transmission. Then, the MAC layer of the terminal device generates a plurality of uplink grants based on an indication of the PHY layer of the terminal, and submits each uplink grant to a corresponding HARQ process, to instruct the PHY layer of the terminal device to perform uplink transmission in one subframe or TTI. In other words, the MAC layer of the terminal device may also generate a plurality of uplink grants based on one uplink grant.

Therefore, the MAC layer of the terminal device may generate a plurality of uplink grants based on one received uplink grant, and submit each uplink grant to a corresponding HARQ process, to instruct the PHY layer of the terminal device to perform uplink transmission in one subframe or TTI.

The foregoing describes in detail the hybrid automatic repeat request method according to the embodiments of the present invention. The following describes a terminal device according to an embodiment of the present invention.

Figure 8:
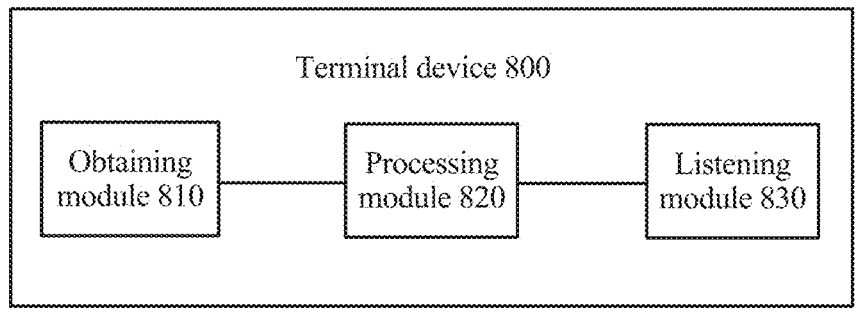
FIG. 8 is a schematic block diagram of a terminal device according to an embodiment of the present invention.

FIG. 8 is a schematic block diagram of a terminal device 800 according to an embodiment of the present invention. As shown in FIG. 8, the terminal device 800 includes:

an obtaining module 810, configured to obtain a first uplink grant sent by a base station, where the first uplink grant is carried in a media access control MAC message;

a processing module 820, configured to: transmit uplink data based on the first uplink grant obtained by the obtaining module 810, and start a first timer, where the processing module 820 is further configured to start a second timer after the first timer expires; and a listening module 830, configured to listen to a physical downlink control channel PDCCH based on the second timer.

In this embodiment of the present invention, the terminal device 800 transmits the uplink data based on the first uplink grant, and starts the first timer. After the first timer expires, the terminal device 800 starts the second timer. In this way, electricity can be saved, and a retransmission delay can be reduced.

Optionally, the terminal device 800 does not listen to the PDCCH before the first timer expires.

Optionally, in an embodiment, the terminal device 800 further includes:

a transmission module, configured to: before the second timer expires and/or is stopped, if a second uplink grant sent by the base station through the PDCCH is detected through listening, perform hybrid automatic repeat request HARQ retransmission or initial transmission of the uplink data based on the second uplink grant.

Therefore, the terminal device 800 transmits the uplink data based on the first uplink grant, and starts the first timer. After the first timer expires, the terminal device 800 starts the second timer. Before the second timer expires and/or is stopped, the terminal device 800 detects, through listening, the second uplink grant sent by the base station through the PDCCH. In this way, electricity can be saved, and the retransmission delay can be reduced. Further, the terminal device can perform HARQ retransmission of the uplink data based on the second uplink grant detected through listening.

Optionally, in an embodiment, the terminal device further includes:

a determining module, configured to: after the second timer expires and/or is stopped, determine, based on current discontinuous reception DRX status information of the terminal device, whether to continue to listen to the PDCCH.

Optionally, in an embodiment, the processing module 820 is specifically configured to:

transmit the uplink data for a plurality of times based on the first uplink grant; and start the first timer and/or a third timer in a subframe of last transmission in the plurality of times of transmission of the uplink data, where the third timer is configured to wait for the base station to send a contention resolution message.

Therefore, the terminal device 800 transmits the uplink datatransmits the uplink data for a plurality of times based on the first uplink grant, and starts the first timer and/or the third timer in the subframe of last transmission in the plurality of times of transmission of the uplink data. After the first timer expires, the terminal device 800 starts the second timer, and listens to the PDCCH based on the second timer. In this way, electricity can be saved, and the retransmission delay can be reduced. Further, transmission is performed a plurality of times, so that a success rate of data transmission can be improved, and a coverage range can be increased.

Optionally, in an embodiment, the terminal device 800 further includes:

a receiving module, configured to: before the third timer expires and/or is stopped, receive the contention resolution message sent by the base station, where the contention resolution message indicates that random access contention of the terminal device succeeds.

The processing module 820 is further configured to stop the second timer based on the contention resolution message.

Optionally, in an embodiment, the processing module 820 is specifically configured to:

when the first timer is started, if the second timer does not expire and/or is not stopped, stop the second timer.

Optionally, in an embodiment, the terminal device 800 further includes:

the processing module is configured to: select, by a MAC layer of the terminal device, a plurality of random access resources and a plurality of random access radio network temporary identifiers RA-RNTIs, and submit the plurality of random access resources and the plurality of RA-RNTIs to a physical layer of the terminal device;

the processing module is further configured to perform, by the physical layer of the terminal device, clear channel assessment on at least one channel, to determine a first channel, where the first channel is in an idle mode, the plurality of random access resources include a random access resource corresponding to the first channel, and the plurality of RA-RNTIs include an RA-RNTI corresponding to the first channel; and a sending module, configured to send, by the physical layer of the terminal device, a random access preamble sequence to the base station by using the random access resource corresponding to the first channel.

The obtaining module is specifically configured to:

receive, by the physical layer of the terminal device by using the RA-RNTI corresponding to the first channel, the MAC message sent by the base station.

Optionally, in an embodiment, a subframe in which the first timer expires or is stopped is the same as or different from a subframe in which the second timer is started.

Optionally, in an embodiment, the listening module 830 is specifically configured to:

before the second timer expires and/or is stopped, the MAC layer of the terminal device controls the physical layer of the terminal device to listen to the PDCCH.

The terminal device 800 according to this embodiment of the present invention may perform the hybrid automatic repeat request method 200 according to the embodiments of the present invention, and the foregoing and other operations and/or functions of the modules in the terminal side device 800 are respectively used to implement corresponding procedures of the foregoing methods. For brevity, details are not described herein again.

Therefore, the terminal device 800 in this embodiment of the present invention transmits the uplink data based on the first uplink grant, and starts the first timer. After the first timer expires, the terminal device 800 starts the second timer. In this way, electricity can be saved, and the retransmission delay can be reduced.

Optionally, in an embodiment, the terminal device may include:

a determining module, configured to determine a hybrid automatic repeat request HARQ process controller;

a generation module, configured to generate, based on the HARQ process controller determined by the determining module, feedback information corresponding to a plurality of HARQ processes; and a sending module, configured to send the feedback (Feedback) information to a base station, where the feedback information is transmitted by using a media access control MAC message.

Optionally, to trigger a feedback status in time, the terminal device may introduce a periodic timer. If the periodic timer expires, the terminal device triggers a terminal device to feed back a feedback status of a HARQ process.

Optionally, the base station may also trigger, by using an uplink grant, a terminal device to feed back a feedback status of a HARQ process. To avoid repeatedly triggering a feedback status, the terminal device may also introduce a prohibit timer. After the prohibit timer expires, the terminal device can trigger the feedback status again.

Therefore, in this embodiment of the present invention, the terminal device determines the HARQ process controller, and feeds back, in one subframe, the feedback information of the plurality of HARQ processes, to better adapt uplink and downlink traffic.

Optionally, in an embodiment, the terminal device may include:

a receiving module, configured to receive configuration information sent by a base station, where the configuration information is used to configure an unlicensed (unlicensed) spectrum secondary serving cell;

a sending module, configured to trigger, by a MAC layer of the terminal device, power headroom report PHR;

a determining module, configured to determine, by a PHY layer of the terminal device, type2 power headroom of a licensed (licensed) primary serving cell based on a received uplink grant delivered by the base station, where the type2 power headroom represents power headroom existing when a physical uplink control channel PUCCH and a physical uplink shared channel PUSCH are simultaneously transmitted; and a notification module, configured to notify, by the PHY layer of the terminal device, the MAC layer of the terminal device of the type2 power headroom of the licensed (licensed) primary serving cell.

The determining module is further configured to generate, by the MAC layer of the terminal device, a MAC control element of the PHR based on the type2 power headroom of the licensed primary serving cell.

In this embodiment of the present invention, the terminal device needs to support simultaneous transmission of a PUCCH of the licensed primary serving cell and a PUSCH of an unlicensed cell. In addition, configuration of the simultaneous transmission does not depend on configuration of simultaneous transmission of a PUCCH and a PUSCH of a licensed cell.

Optionally, in this embodiment of the present invention, the type2 power headroom may be specifically represented by using the following formula:

$$PH_{type2}(i) = P_{CMAX,c}(i) - 10\log_{10}$$

$$\left( 10^{(10\log_{10}(M_{PUSCH,c}(i)) + P_{O\_PUSCH,c}(i) + \alpha_c(j)PL_c + \Delta_{TF,c}(i) + f_c(i))/10} + \right.$$
$$\left. 10^{(P_{O\_PUCCH} + PL_c + h(n_{CQI}, n_{HARQ}, n_{SR}) + \Delta_{F\_PUCCH}(F) + \Delta_{TxD}(F') + g(i))/10} \right),$$

where $P_{CMAX,c}(i)$ is maximum transmit power of the terminal in a subframe i in a current serving cell c. $M_{PUSCH,c}(i)$ is bandwidth of a PUSCH and is in a unit of RB. $P_{O\_PUSCH,c}(j)$ is expected power when a single RB is received, and a value of $P_{O\_PUSCH,c}(j)$ is controlled by an upper-layer parameter based on different values of j (j∈{0, 1, 2}), $\alpha_c(j)$ is a path loss compensation factor; $PL_c$ is downlink path loss estimation and is in a unit of dB; $\Delta_{TF,c}(i)$ is transmit power offset, and reflects that different modulation formats require different signal to interference plus noise ratios (Signal to Interference plus Noise ratio, "SINR" for short) in PUSCH transmission; and $f_c(i)$ is a current PUSCH power control adjustment status. The parameter $\Delta_{TF,c}(i)$ is defined in a standard:

$$\Delta_{TF,c}(i) = 10\log_{10}(2^{1.25 \cdot BPRE(i)} - 1), \text{where}$$

$$BPRE(i) = O_{UCI}(i)/N_{RE}(i), \text{where}$$

$O_{UCI}(i)$ is a quantity of bits for transmitting hybrid automatic repeat request feedback (Hybrid automatic repeat request-Acknowledgment, "HARQ-ACK" for short)/scheduling request (Scheduling Request, "SR" for short)/rank indicator (Rank Indicator, "RI" for short)/channel quality indicator (Channel Quality Indicator, "CQI" for short)/ precoding matrix indicator (Precoding Matrix Indicator, "PMI" for short) information in a PUCCH format 4/5. $N_{RE}(i)$ is a quantity of resource elements (Resource element, "RE" for short) in a subframe i. When a PUCCH uses the format 4, $N_{RE}(i) = M_{PUCCH,s}(i) \cdot N_{sc}^{RB} \cdot N_{symb}^{PUCCH}$. When a PUCCH uses the format 5, $N_{RE}(i) = N_{sc}^{RB} \cdot N_{symb}^{PUCCH}/2$. $N_{sc}^{RB}$ is a quantity of subcarriers included in one RB, and $N_{symb}^{PUCCH}$ is a quantity of symbols included in a PUCCH channel. $P_{O\_PUCCH}$ may be considered as power expected by the base station when a single resource block (Resource Block, "RB" for short) is received, and $P_{O\_PUCCH}$ is related to intensity of noise and interference of an uplink. $h(n_{CQI}, n_{HARQ}, n_{SR})$ is related to a PUCCH format, and different PUCCH formats are corresponding to different values. A value of $\Delta_{F\_PUCCH}(F)$ is controlled by an upper layer, and the value of $\Delta_{F\_PUCCH}(F)$ is related to a format used by a PUCCH. A PUCCH format 1a is usually used as a reference. A parameter $\Delta_{TxD}(F')$ is related to transmit diversity, and is valid only when a PUCCH is sent on two antenna ports. Otherwise, a value of the parameter is 0. g(i) is a current PUCCH power control adjustment status.

Therefore, in this embodiment of the present invention, the type2 power headroom formula is introduced, so that transmit power headroom existing when the PUCCH and the PUSCH are simultaneously transmitted can be determined according to the type2 power headroom formula.

Optionally, in an embodiment, the terminal device may include:

a receiving module, configured to receive, by a PHY layer of the terminal device, an uplink grant sent by a base station;

a sending module, configured to generate, by the PHY layer of the terminal device, a plurality of uplink grants based on the uplink grant, and sends the plurality of uplink grants to a MAC layer of the terminal device by using at least one subframe; and a transmission module, configured to perform, by the terminal device, uplink transmission based on any one of the plurality of uplink grants.

In this embodiment of the present invention, the PHY layer of the terminal device may submit the plurality of received uplink grants to the MAC layer in a plurality of subframes or in one subframe.

Figure 9:
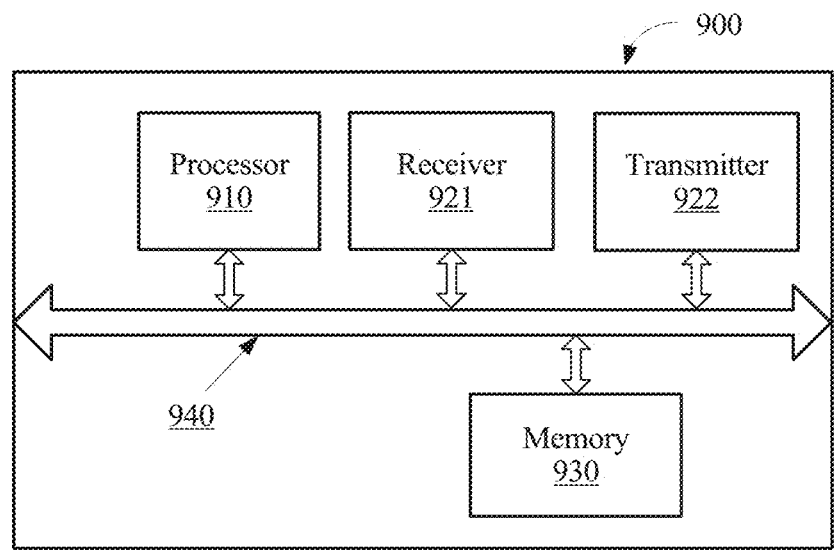
FIG. 9 is a structural block diagram of a terminal device according to an embodiment of the present invention.

It should be noted that in this embodiment of the present invention, the obtaining module 810 may be implemented by a transceiver, and the processing module 820 and the listening module 830 may be implemented by a processor. As shown in FIG. 9, a terminal device 900 may include a processor 910, a transceiver 920, and a memory 930. The transceiver 920 may include a receiver 921 and a transmitter 922. The memory 930 may be configured to store a basic parameter set, a DCI format, a correspondence between a basic parameter set and a DCI format, and the like, and may be further configured to store code executed by the processor 910, and the like. Components of the terminal device 900 are coupled together by using a bus system 940. In addition to a data bus, the bus system 940 includes a power bus, a control bus, a status signal bus, and the like. The transceiver 920 is configured to:

obtain a first uplink grant sent by a base station, where the first uplink grant is carried in a media access control MAC message.

The processor 910 is specifically configured to: transmit uplink data based on the first uplink grant, and start a first timer;

start a second timer after the first timer expires; and listen to a physical downlink control channel PDCCH based on the second timer.

In this embodiment of the present invention, the terminal device transmits the uplink data based on the first uplink grant, and starts the first timer. After the first timer expires, the terminal device starts the second timer. Finally, the terminal device listens to the PDCCH based on the second timer. In this way, electricity can be saved, and a retransmission delay can be reduced.

Optionally, the terminal device does not listen to the PDCCH before the first timer expires.

Optionally, in an embodiment, the processor 910 is configured to:

before the second timer expires and/or is stopped, if a second uplink grant sent by the base station through the PDCCH is detected through listening, perform hybrid automatic repeat request HARQ retransmission of the uplink data based on the second uplink grant.

Optionally, in an embodiment, the processor 910 is configured to:

after the second timer expires and/or is stopped, determine, based on current discontinuous reception DRX status information of the terminal device, whether to continue to listen to the PDCCH.

Optionally, in an embodiment, the processor 910 is configured to:

transmit the uplink data for a plurality of times based on the first uplink grant; and start the first timer and/or a third timer in a subframe of last transmission in the plurality of times of transmission of the uplink data, where the third timer is configured to wait for the base station to send a contention resolution message.

Optionally, in an embodiment, the processor 910 is configured to:

before the third timer expires and/or is stopped, receive the contention resolution message sent by the base station, where the contention resolution message indicates that random access contention of the terminal device succeeds; and stop the second timer based on the contention resolution message.

Optionally, in an embodiment, the processor 910 is configured to:

when the first timer is started, if the second timer does not expire and/or is not stopped, stop the second timer.

Optionally, in an embodiment, before the first uplink grant sent by the base station is obtained, the processor 910 is configured to:

select, by a MAC layer of the terminal device, a plurality of random access resources and a plurality of random access radio network temporary identifiers RA-RNTIs, and submit the plurality of random access resources and the plurality of RA-RNTIs to a physical layer of the terminal device;

perform, by the physical layer of the terminal device, clear channel assessment on at least one channel, to determine a first channel, where the first channel is in an idle mode, the plurality of random access resources include a random access resource corresponding to the first channel, and the plurality of RA-RNTIs include an RA-RNTI corresponding to the first channel; and send, by the physical layer of the terminal device, a random access preamble sequence to the base station by using the random access resource corresponding to the first channel.

The obtaining a first uplink grant sent by a base station includes:

receiving, by the physical layer of the terminal device by using the RA-RNTI corresponding to the first channel, the MAC message sent by the base station.

Optionally, a subframe in which the first timer expires or is stopped is the same as or different from a subframe in which the second timer is started.

Optionally, the processor 910 is configured to:

before the second timer expires and/or is stopped, the MAC layer of the terminal device controls the physical layer of the terminal device to listen to the PDCCH.

In this embodiment of the present invention, the terminal device transmits the uplink data based on the first uplink grant, and starts the first timer. After the first timer expires, the terminal device starts the second timer. Finally, the terminal device listens to the PDCCH based on the second timer. In this way, electricity can be saved, and a retransmission delay can be reduced.

Figure 10:
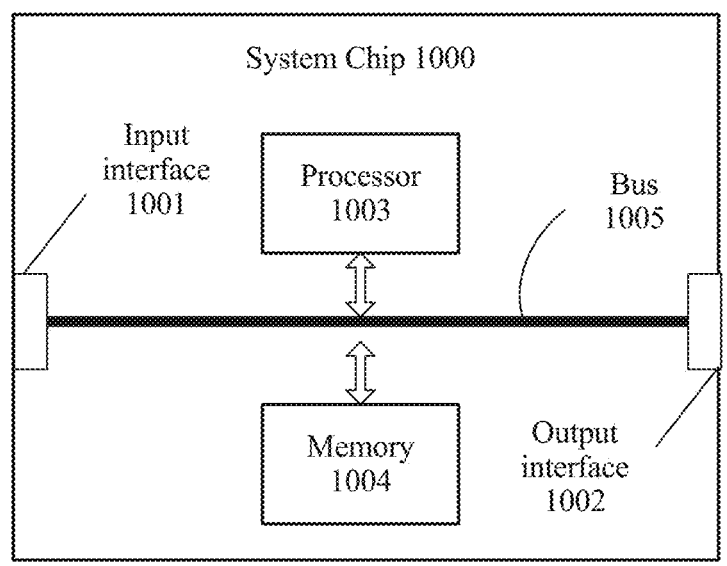
FIG. 10 is a schematic structural diagram of a system chip according to an embodiment of the present invention.

FIG. 10 is a schematic structural diagram of a system chip according to an embodiment of the present invention. A system chip 1000 in FIG. 10 includes an input interface 1001, an output interface 1002, at least one processor 1003, and a memory 1004. The input interface 1001, the output interface 1002, the processor 1003, and the memory 1004 are connected by using a bus 1005. The processor 1003 is configured to execute code in the memory 1004. When the code is executed, the processor 1003 implements the methods performed by the terminal device in FIG. 2 to FIG. 7B.

The terminal device 800 shown in FIG. 8 or the terminal device 900 shown in FIG. 9 or the system chip 1000 shown in FIG. 10 can implement processes implemented by the terminal device in the foregoing method embodiments of FIG. 2 to FIG. 7B. To avoid repetition, details are not described herein again.

It should be understood that the processor in the embodiments of the present invention may be an integrated circuit chip, and has a signal processing capability. In an implementation process, steps in the foregoing method embodiments can be implemented by using an integrated logic circuit of hardware in the processor or an instruction in a form of software. The processor may be a general purpose processor, a digital signal processor (Digital Signal Processor, "DSP" for short), an application-specific integrated circuit (Application-Specific Integrated Circuit, "ASIC" for short), a field programmable gate array (Field Programmable Gate Array, "FPGA" for short) or another programmable logic device, a discrete gate or a transistor logic device, a discrete hardware component, or the like. The processor may implement or perform the methods, the steps, and logical block diagrams that are disclosed in the embodiments of the present invention. The general purpose processor may be a microprocessor, or the processor may be any conventional processor or the like. The steps of the methods disclosed with reference to the embodiments of the present invention may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (Read-Only Memory, "ROM" for short), a programmable read-only memory (Programmable ROM, "PROM" for short), an erasable programmable read-only memory (Erasable PROM, "EPROM" for short), an electrically erasable programmable read-only memory (Electrically EPROM, "EEPROM" for short), or a flash memory. The volatile memory may be a random access memory (Random Access Memory, "RAM" for short), and is used as an external cache. For example but not for limitation, many forms of RAMs are available, for example, a static random access memory (Static RAM, "SRAM" for short), a dynamic random access memory (Dynamic RAM, "DRAM" for short), a synchronous dynamic random access memory (Synchronous DRAM, "SDRAM" for short), a double data rate synchronous dynamic random access memory (Double Data Rate SDRAM, "DDR SDRAM" for short), an enhanced synchronous dynamic random access memory (Enhanced SDRAM, "ESDRAM" for short), a synchlink dynamic random access memory (Synchlink DRAM, "SLDRAM" for short), and a direct rambus random access memory (Direct Rambus RAM, "DR RAM" for short). It should be noted that the memory in the system and methods described in this specification includes but is not limited to these memories and any memory of another proper type.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only. B may also be determined according to A and/or other information.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A hybrid automatic repeat request (HARQ) method, comprising:
   obtaining, by a terminal device, a first uplink grant from a base station, wherein the first uplink grant is carried in a media access control (MAC) message;
   transmitting, by the terminal device, uplink data based on the first uplink grant during a plurality of transmission time periods;
   starting, by the terminal device, a first timer in a subframe corresponding to a last transmission time period of the plurality of transmission time periods, wherein the terminal device does not listen to a physical downlink control channel (PDCCH) during and based on running of the first timer;
   after the first timer is stopped or expires, starting, by the terminal device, a second timer; and
   listening, by the terminal device, to the PDCCH during and based on running of the second timer;
   detecting, by the terminal device, based on listening to the PDCCH, a second uplink grant from the base station; and
   performing, by the terminal device, a HARQ retransmission or an initial transmission based on the second uplink grant;
   wherein the method further comprises:
   starting a third timer in the subframe corresponding to the last transmission time period of the plurality of transmission time periods, wherein the third timer corresponds to waiting for the base station to send a contention resolution message;
   before the third timer expires or is stopped, receiving a contention resolution message from the base station, wherein the contention resolution message indicates that random access contention of the terminal device succeeds; and
   stopping the second timer based on the contention resolution message.

2. The method according to claim 1, wherein the method further comprises:
   after the second timer expires or is stopped, determining, by the terminal device based on current discontinuous reception (DRX) status information of the terminal device, whether to continue to listen to the PDCCH.

3. The method according to claim 1, wherein a previous running of the second timer is stopped when the first timer is started, stopping the second timer.

4. The method according to claim 1, wherein before obtaining the first uplink grant from the base station, the method further comprises:
   selecting, by a MAC layer of the terminal device, a plurality of random access resources and a plurality of random access radio network temporary identifiers (RA-RNTIs), and submitting the plurality of random access resources and the plurality of RA-RNTIs to a physical layer of the terminal device;
   performing, by the physical layer of the terminal device, clear channel assessment on at least one channel, to determine a first channel, wherein the first channel is in an idle mode, the plurality of random access resources comprise a random access resource corresponding to the first channel, and the plurality of RA-RNTIs comprise an RA-RNTI corresponding to the first channel; and
   sending, by the physical layer of the terminal device, a random access preamble sequence to the base station by using the random access resource corresponding to the first channel; and
   wherein obtaining the first uplink grant from the base station comprises:
   receiving, by the physical layer of the terminal device by using the RA-RNTI corresponding to the first channel, the MAC message from the base station.

5. The method according to claim 1, wherein a subframe in which the first timer expires or is stopped is the same as a subframe in which the second timer is started.

6. The method according to claim 1, wherein a subframe in which the first timer expires or is stopped is different from a subframe in which the second timer is started.

7. An apparatus, comprising:
   a receiver configured to obtain a first uplink grant from a base station, wherein the first uplink grant is carried in a media access control (MAC) message;
   a transmitter configured to transmit uplink data based on the first uplink grant; and
   a processor configured to:
     start a first timer in a subframe corresponding to a last transmission time period of the plurality of transmission time periods, wherein the apparatus does not listen to a physical downlink control channel (PDCCH) during and based on running of the first timer;
     start a second timer after the first timer is stopped or expires;
     listen to a physical downlink control channel (PDCCH) during and based on running of the second timer; and
     detect, based on listening to the PDCCH, a second uplink grant from the base station;

wherein the transmitter is further configured to perform a hybrid automatic repeat request (HARQ) retransmission or an initial transmission based on the second uplink grant;

wherein the processor is further configured to start a third timer in a subframe corresponding to the last transmission time period of the plurality of transmission time periods, wherein the third timer corresponds to waiting for the base station to send a contention resolution message;

wherein the receiver is further configured to: before the third timer expires or is stopped, receive the contention resolution message from the base station, wherein the contention resolution message indicates that random access contention of the apparatus succeeds; and wherein the processor is further configured to stop the second timer based on the contention resolution message.

8. The apparatus according to claim 7, wherein the processor is further configured to:
  after the second timer expires or is stopped, determine, based on current discontinuous reception (DRX) status information of the apparatus, whether to continue to listen to the PDCCH.

9. The apparatus according to claim 7, wherein the processor is further configured to stop a previous running of the second timer when the first timer is started.

10. The apparatus according to claim 7, wherein the processor is further configured to:
  select a plurality of random access resources and a plurality of random access radio network temporary identifiers (RA-RNTIs), and submit the plurality of random access resources and the plurality of RA-RNTIs to a physical layer of the apparatus;
  perform clear channel assessment on at least one channel, to determine a first channel, wherein the first channel is in an idle mode, the plurality of random access resources comprise a random access resource corresponding to the first channel, and the plurality of RA-RNTIs comprise an RA-RNTI corresponding to the first channel;
  wherein the transmitter is further configured to send a random access preamble sequence to the base station by using the random access resource corresponding to the first channel; and
  wherein the receiver is further configured to: receive, by using the RA-RNTI corresponding to the first channel, the MAC message from the base station.

11. The apparatus according to claim 7, wherein a subframe in which the first timer expires or is stopped is the same as a subframe in which the second timer is started.

12. The apparatus according to claim 7, wherein a subframe in which the first timer expires or is stopped is different from a subframe in which the second timer is started.

13. A non-transitory computer-readable medium having processor-executable instructions stored thereon, wherein the processor-executable instructions, when executed, facilitate:
  obtaining, by a terminal device, a first uplink grant from a base station, wherein the first uplink grant is carried in a media access control (MAC) message;
  transmitting, by the terminal device, uplink data based on the first uplink grant during a plurality of transmission time periods;
  starting, by the terminal device, a first timer in a subframe corresponding to a last transmission time period of the plurality of transmission time periods, wherein the terminal device does not listen to a physical downlink control channel (PDCCH) during and based on running of the first timer;
  after the first timer is stopped or expires, starting, by the terminal device, a second timer; and
  listening, by the terminal device, to the PDCCH during and based on running of the second timer;
  detecting, by the terminal device, based on listening to the PDCCH, a second uplink grant from the base station; and
  performing, by the terminal device, a hybrid automatic repeat request (HARQ) retransmission or an initial transmission based on the second uplink grant;
  wherein the processor-executable instructions, when executed, further facilitate:
    starting a third timer in the subframe corresponding to the last transmission time period of the plurality of transmission time periods, wherein the third timer corresponds to waiting for the base station to send a contention resolution message;
    before the third timer expires or is stopped, receiving a contention resolution message from the base station, wherein the contention resolution message indicates that random access contention of the terminal device succeeds; and
    stopping the second timer based on the contention resolution message.

* * * * *